(12) United States Patent
Kimura et al.

(10) Patent No.: US 11,822,194 B2
(45) Date of Patent: Nov. 21, 2023

(54) DISPLAY DEVICE

(71) Applicant: Japan Display Inc., Tokyo (JP)

(72) Inventors: Fumiya Kimura, Tokyo (JP); Isao Suzumura, Tokyo (JP); Junko Nagasawa, Tokyo (JP); Atsuko Imoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/749,217

(22) Filed: May 20, 2022

(65) Prior Publication Data

US 2022/0373846 A1 Nov. 24, 2022

(30) Foreign Application Priority Data

May 24, 2021 (JP) .................................. 2021-087007

(51) Int. Cl.
*G02F 1/1362* (2006.01)
*G02F 1/1368* (2006.01)

(52) U.S. Cl.
CPC ...... *G02F 1/136222* (2021.01); *G02F 1/1368* (2013.01); *G02F 1/136209* (2013.01); *G02F 1/136286* (2013.01)

(58) Field of Classification Search
CPC ......... G02F 1/136222; G02F 1/136209; G02F 1/136286; G02F 1/1368; G02F 1/136277; G02F 1/1362; G02F 1/1333; G02F 1/13338; G02F 1/133345; H01L 27/12; H01L 29/78633; H01L 27/124; H01L 29/458; H01L 29/78675; H01L 29/51; H01L 27/1222; H01L 29/518; H01L 29/4908; H01L 27/1288
See application file for complete search history.

(56) References Cited

U.S. PATENT DOCUMENTS

| | | | |
|---|---|---|---|
| 2003/0071888 A1* | 4/2003 | Roddy ..................... | B41J 2/465 347/241 |
| 2007/0029613 A1* | 2/2007 | Moriwaki ......... | G02F 1/136213 257/E27.113 |
| 2007/0159570 A1* | 7/2007 | Nagasawa ............. | G02F 1/1345 349/38 |
| 2008/0192159 A1* | 8/2008 | Ishii .................. | G02F 1/136213 349/39 |

(Continued)

FOREIGN PATENT DOCUMENTS

CN 111381411 A * 7/2020 ......... G02F 1/13338
JP 2010072512 A * 4/2010

*Primary Examiner* — Hoan C Nguyen
(74) *Attorney, Agent, or Firm* — Michael Best & Friedrich LLP

(57) ABSTRACT

According to one embodiment, a display device includes a semiconductor layer, a first insulating layer, a gate electrode, a second insulating layer, a third insulating layer, a color filter, and transparent conductive layers including a pixel electrode, a first conductive layer, and a second conductive layer. The first conductive layer is located between the second insulating layer and the third insulating layer, and is in contact with a second area of the semiconductor layer. The second conductive layer is located on the color filter and is in contact with the first conductive layer. The pixel electrode is located on the second conductive layer and is in contact with the second conductive layer.

8 Claims, 25 Drawing Sheets

(56) References Cited

U.S. PATENT DOCUMENTS

| | | | |
|---|---|---|---|
| 2012/0068944 A1* | 3/2012 | Oh | G02F 1/13338 445/24 |
| 2015/0041800 A1 | 2/2015 | Miyamoto et al. | |
| 2016/0247831 A1 | 8/2016 | Makita et al. | |
| 2020/0285090 A1* | 9/2020 | Tanaka | H01L 27/3248 |

* cited by examiner

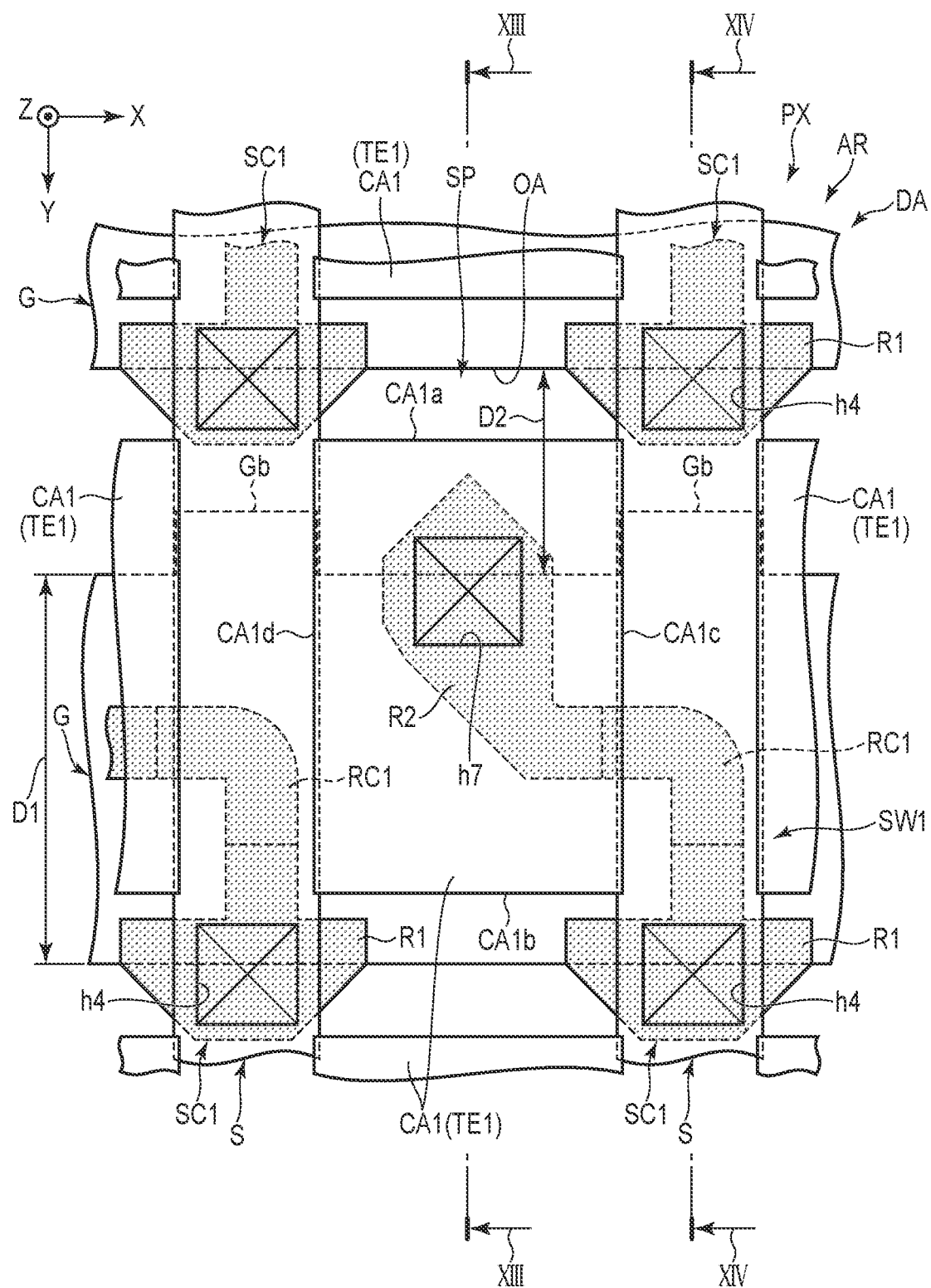
F I G. 7

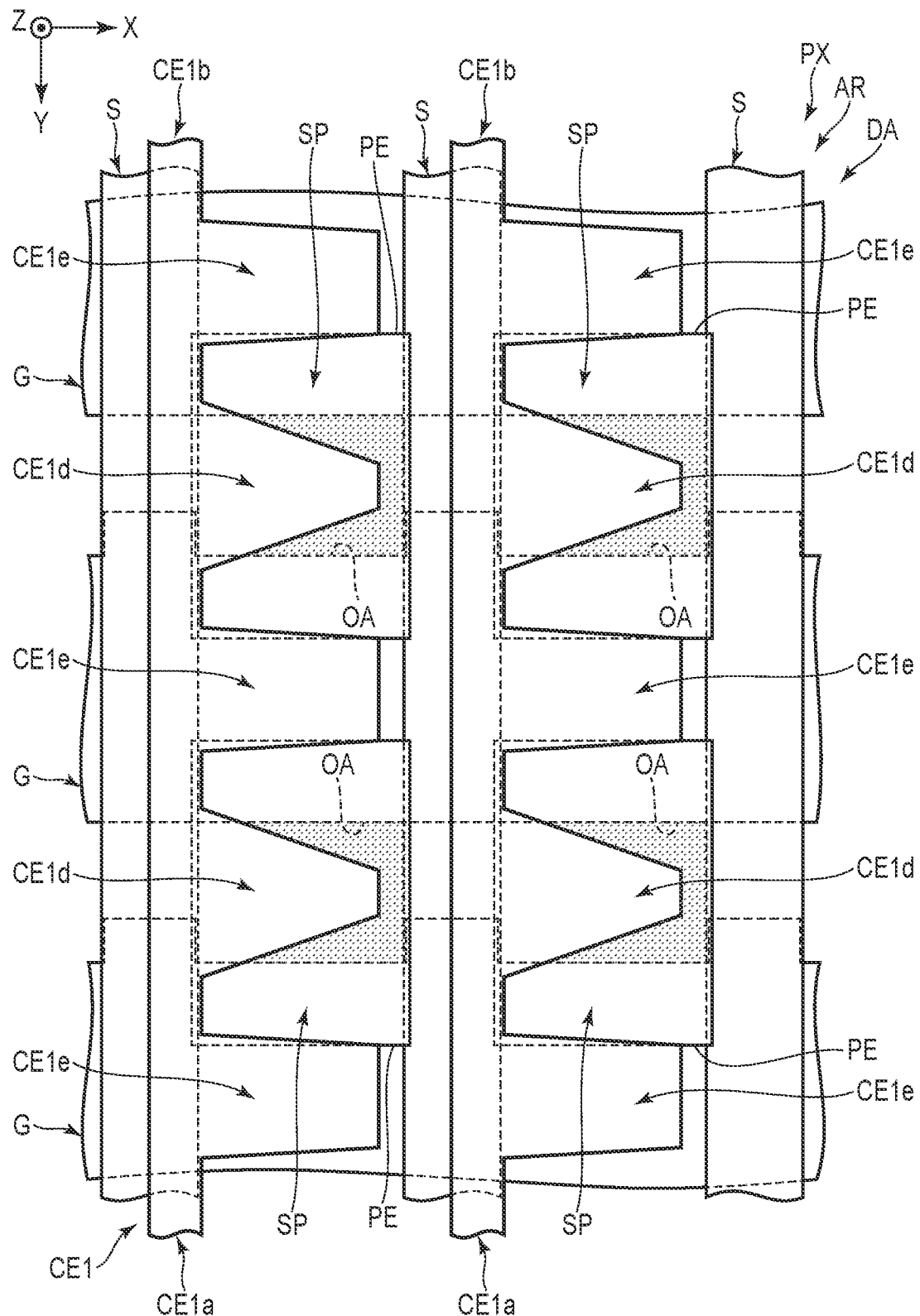
F I G. 12

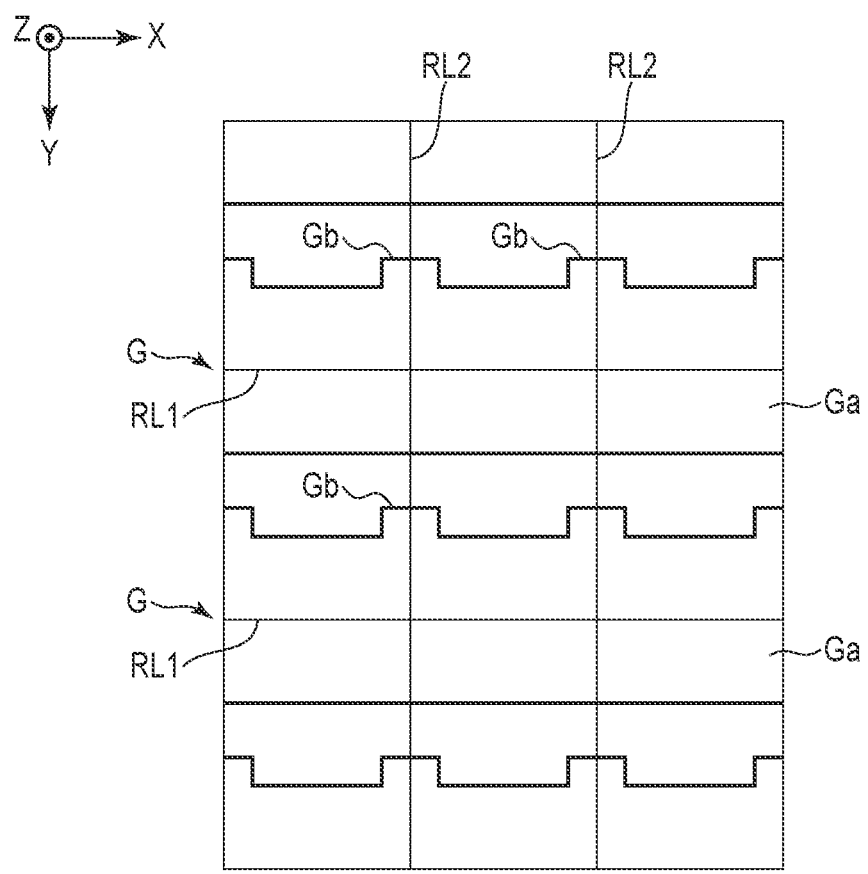
F I G. 16

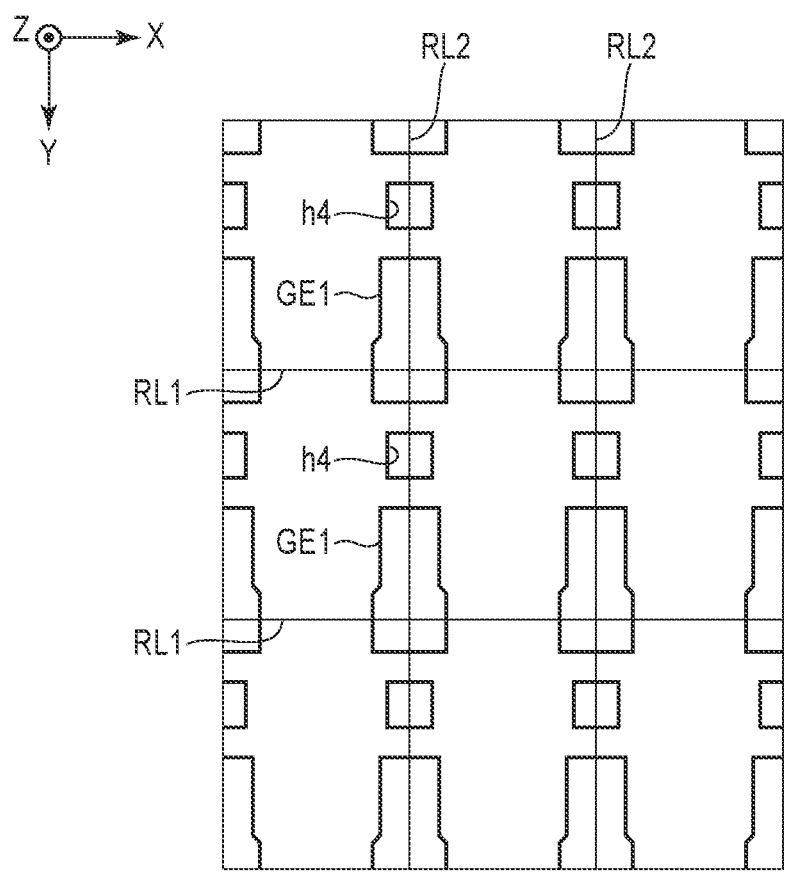
F I G. 18

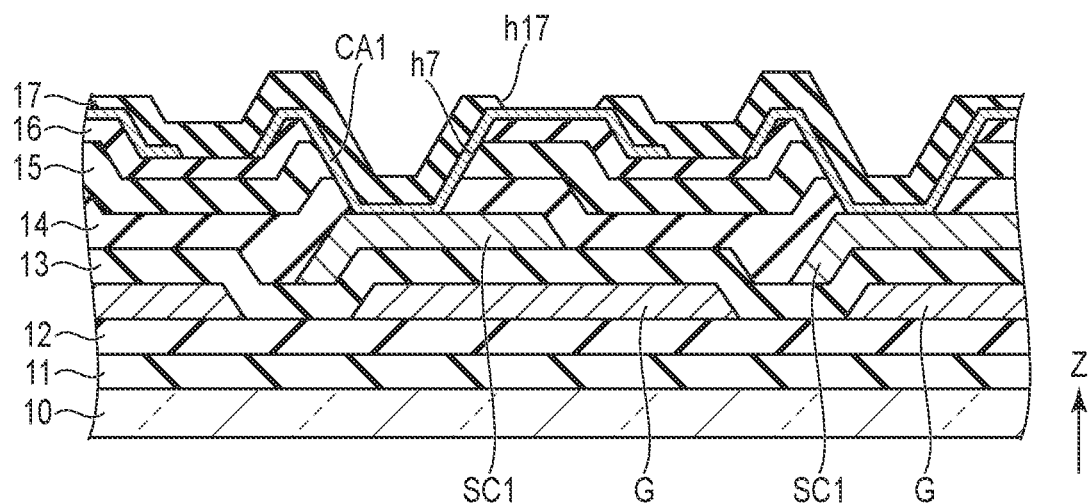
F I G. 20
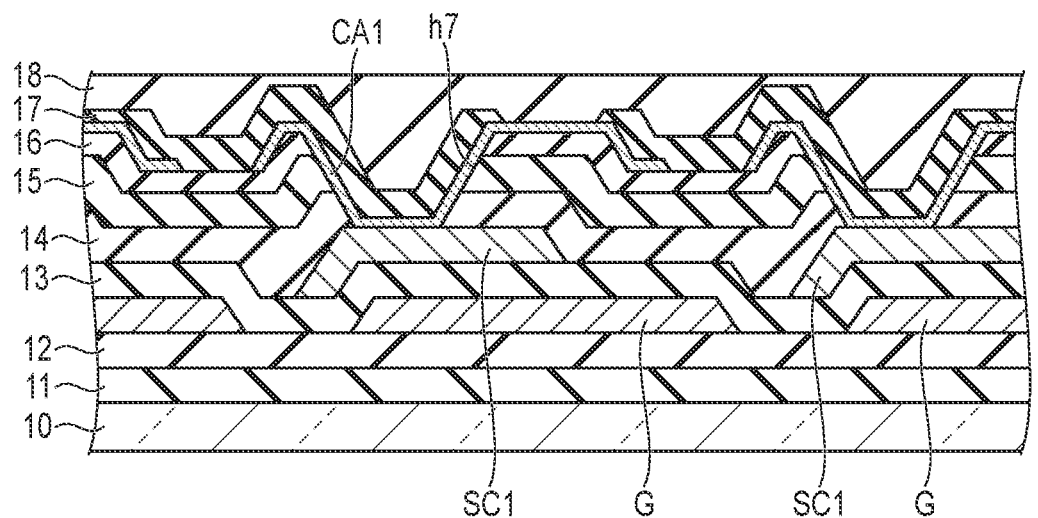
F I G. 21

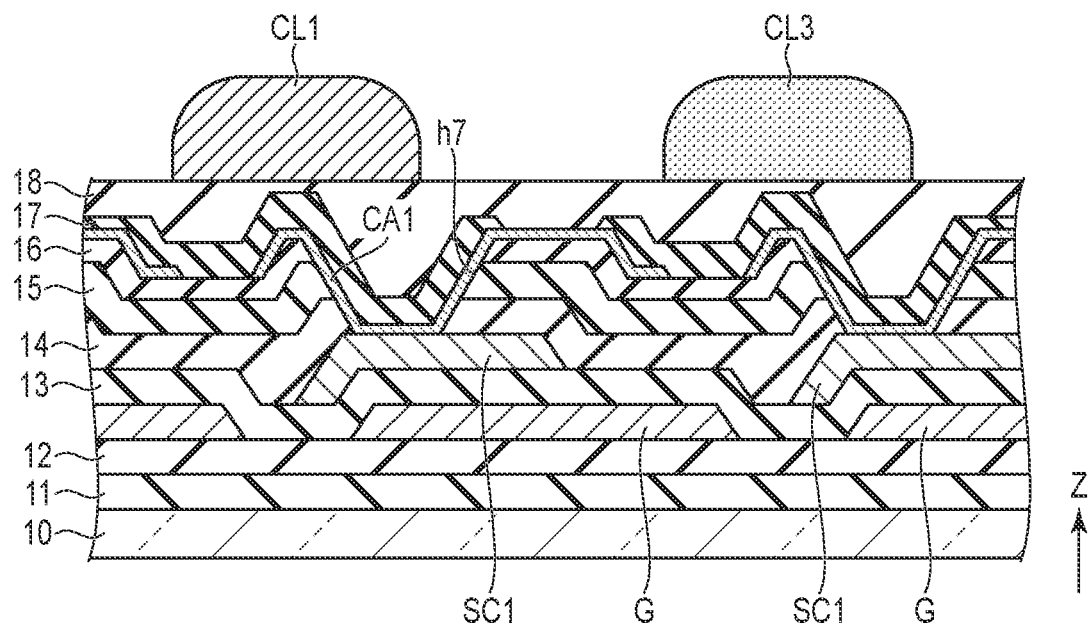
F I G. 22
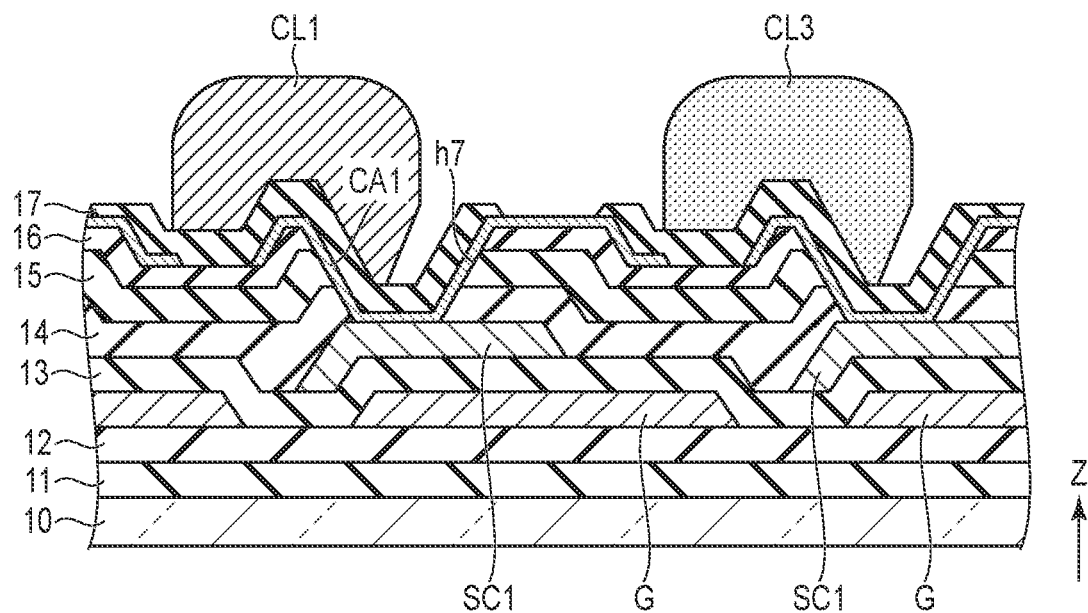
F I G. 23

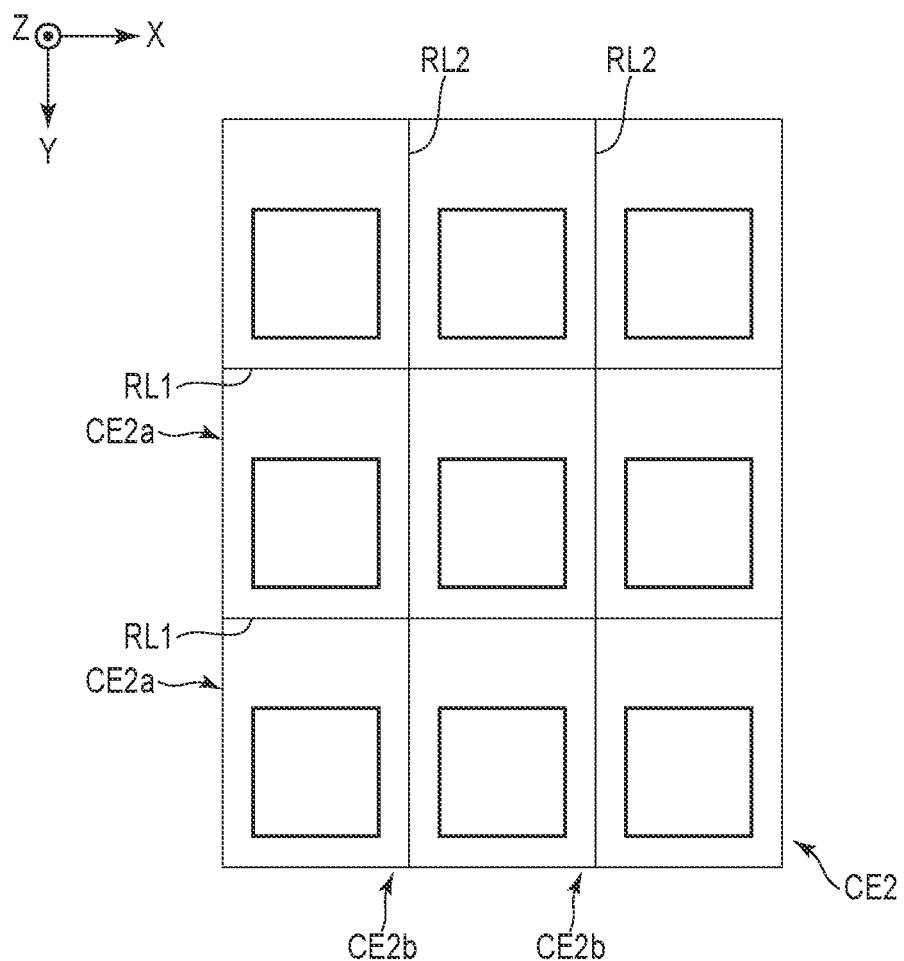
F I G. 26

DISPLAY DEVICE

CROSS-REFERENCE TO RELATED APPLICATIONS

This application is based upon and claims the benefit of priority from Japanese Patent Application No. 2021-087007, filed May 24, 2021, the entire contents of which are incorporated herein by reference.

FIELD

Embodiments described herein relate generally to display devices.

BACKGROUND

Liquid crystal display devices, for example, are known as display devices. Liquid crystal display devices are characterized by their high luminance and high reliability. In the display devices, there is a demand for higher definition. To secure a certain level of luminance, it is necessary to improve the aperture ratio. However, it is difficult to improve the aperture ratio due to problems such as wiring line layout.

BRIEF DESCRIPTION OF THE DRAWINGS

FIG. 7 is an enlarged plan view of a part of the display area of the array substrate above, showing a plurality of gate lines, a plurality of semiconductor layers, a plurality of source lines, and a plurality of contact electrodes.

FIG. 12 is an enlarged plan view of a part of a display area of an array substrate according to a modified example of the above embodiment, showing a plurality of gate lines, a plurality of source lines, a plurality of pixel electrodes, and a first common electrode.

FIG. 16 is a plan view illustrating a manufacturing method of the array substrate according to the above embodiment, and shows a plurality of gate lines.

FIG. 16, is a plan view illustrating the above manufacturing method, and shows a plurality of semiconductor layers and a plurality of contact holes.

FIG. 18, following FIG. 17, is a plan view illustrating the above manufacturing method, and shows a plurality of gate electrodes and a plurality of contact holes.

FIG. 18, is a plan view illustrating the above manufacturing method, and shows a plurality of source lines.

FIG. 20, following FIG. 19, is a cross-sectional view illustrating the above manufacturing method, and shows a plurality of insulating layers, a plurality of semiconductor layers, a plurality of contact electrodes, etc.

FIG. 21, following FIG. 20, is a cross-sectional view illustrating the above manufacturing method, and shows a plurality of insulating layers, a plurality of semiconductor layers, a plurality of contact electrodes, etc.

FIG. 22, following FIG. 21, is a cross-sectional view illustrating the above manufacturing method, and shows a plurality of insulating layers, a plurality of contact electrodes, a color filter, etc.

FIG. 23 is a cross-sectional view illustrating a manufacturing method of an array substrate according to a comparative example, and, following FIG. 20, shows a state in which the color filter is formed.

FIG. 22, is a plan view illustrating the above manufacturing method, and shows a plurality of contact electrodes and a plurality of contact holes.

FIG. 24, is a plan view illustrating the above manufacturing method, and shows a plurality of contact electrodes and a plurality of contact holes.

FIG. 26, following FIG. 25, is a plan view illustrating the above manufacturing method, and shows a second common electrode.

FIG. 26, is a plan view illustrating the above manufacturing method, and shows a metal layer.

FIG. 27, is a plan view illustrating the above manufacturing method, and shows a plurality of pixel electrodes and a plurality of contact holes.

DETAILED DESCRIPTION

Figure 1:
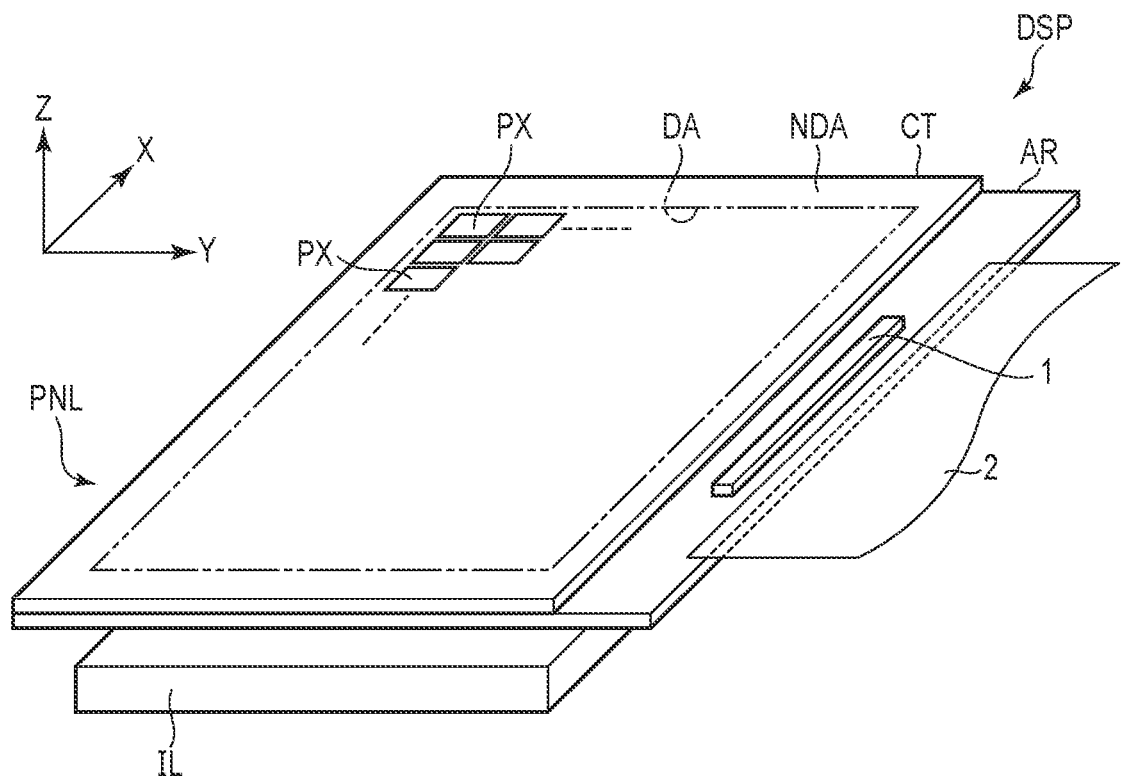
FIG. 1 is a perspective view showing a configuration of a liquid crystal display device of one embodiment.

In general, according to one embodiment, there is provided a display device comprising: a semiconductor layer including a first area, a second area, and a channel area between the first area and the second area; a first insulating layer located on the semiconductor layer; a gate electrode located on the first insulating layer and facing the channel area; a second insulating layer located on the first insulating layer and the gate electrode; a third insulating layer located on the second insulating layer and formed of an organic insulating material; a color filter located on the third insulating layer; and a plurality of transparent conductive layers located on the second insulating layer and including a pixel electrode, a first conductive layer, and a second conductive layer. The first conductive layer is located between the second insulating layer and the third insulating layer, and is in contact with the second area of the semiconductor layer through a first contact hole formed in the first insulating layer and the second insulating layer. The second conductive layer is located on the color filter and is in contact with the first conductive layer. The pixel electrode is located on the second conductive layer and is in contact with the second conductive layer.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

In the present disclosure, the expressions "on" and "under" shall include both cases where an object is located directly in contact with upper/lower surfaces of a certain structure, and cases where an object is located above/below a certain structure, including other structures between the object and the structure.

FIG. 1 is a perspective view showing a structure of a liquid crystal display device DSP according to the present embodiment. Here, a first direction X and a second direction Y are orthogonal to each other; however, they may also intersect at an angle other than 90°. A third direction Z is orthogonal to each of the first direction X and the second direction Y.

As shown in FIG. 1, a liquid crystal display device DSP comprises an active matrix liquid crystal display panel PNL, a drive unit 1 that drives the liquid crystal display panel PNL, an illumination device IL that illuminates the liquid crystal display panel PNL, a wiring substrate 2, etc.

The liquid crystal display panel PNL comprises a flat array substrate AR and a flat counter substrate CT. In the present embodiment, the array substrate AR functions as a first substrate and the counter substrate CT functions as a second substrate. The liquid crystal display panel PNL comprises a display area DA that displays images and a non-display area NDA, which is other than the display area DA. The non-display area NDA is located outside the display area DA and surrounds the display area DA. The liquid crystal display panel PNL comprises a plurality of pixels PX arranged in a matrix in the first direction X and the second direction Y in the display area DA.

The illumination device IL is arranged on a back surface of the array substrate AR. In the present embodiment, the illumination device IL functions as a backlight unit.

The drive unit 1 is mounted on the array substrate AR. The wiring substrate 2 is connected and fixed to the liquid crystal display panel PNL. For example, the drive unit 1 is an external circuit such as a driver IC, and the wiring substrate 2 is a flexible printed circuit (FPC). The drive unit 1 is not limited to being mounted on the array substrate AR, but may also have a structure where it is mounted on the wiring substrate 2.

Figure 2:
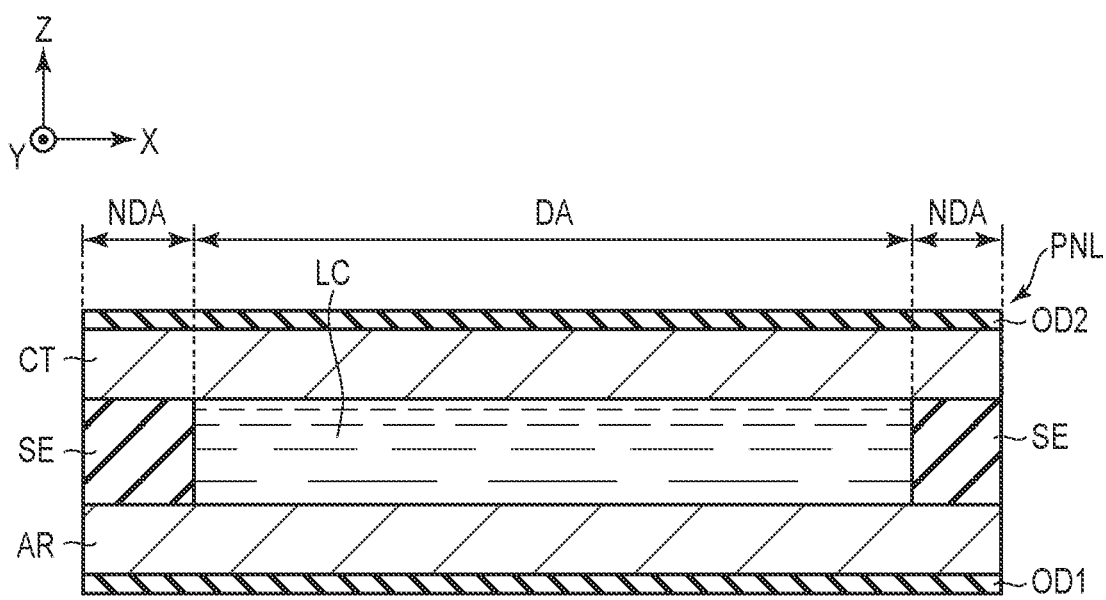
FIG. 2 is a cross-sectional view showing a liquid crystal display panel shown in FIG. 1.

FIG. 2 is a cross-sectional view showing the above liquid crystal display panel PNL.

As shown in FIG. 2, the counter substrate CT is located facing the array substrate AR with a predetermined gap. The liquid crystal display panel PNL further comprises a sealing member SE, a liquid crystal layer LC, a first optical element $OD^1$, and a second optical element OD2. The sealing member SE is arranged on the non-display area NDA and is used to bond the array substrate AR and the counter substrate CT. The liquid crystal layer LC is held between the array substrate AR and the counter substrate CT, and is formed in a space surrounded by the array substrate AR, the counter substrate CT, and the sealing member SE.

The first optical element OD1 is arranged on the opposite side of a surface of the array substrate AR in contact with the liquid crystal layer LC. The second optical element OD2 is arranged on the opposite side of a surface of the counter substrate CT in contact with the liquid crystal layer LC. The first optical element OD1 and the second optical element OD2 each include at least a polarizer and may also include a retardation plate if necessary. An absorption axis of the polarizer included in the first optical element OD1 is, for example, orthogonal to an absorption axis of the polarizer included in the second optical element OD2.

Figure 3:
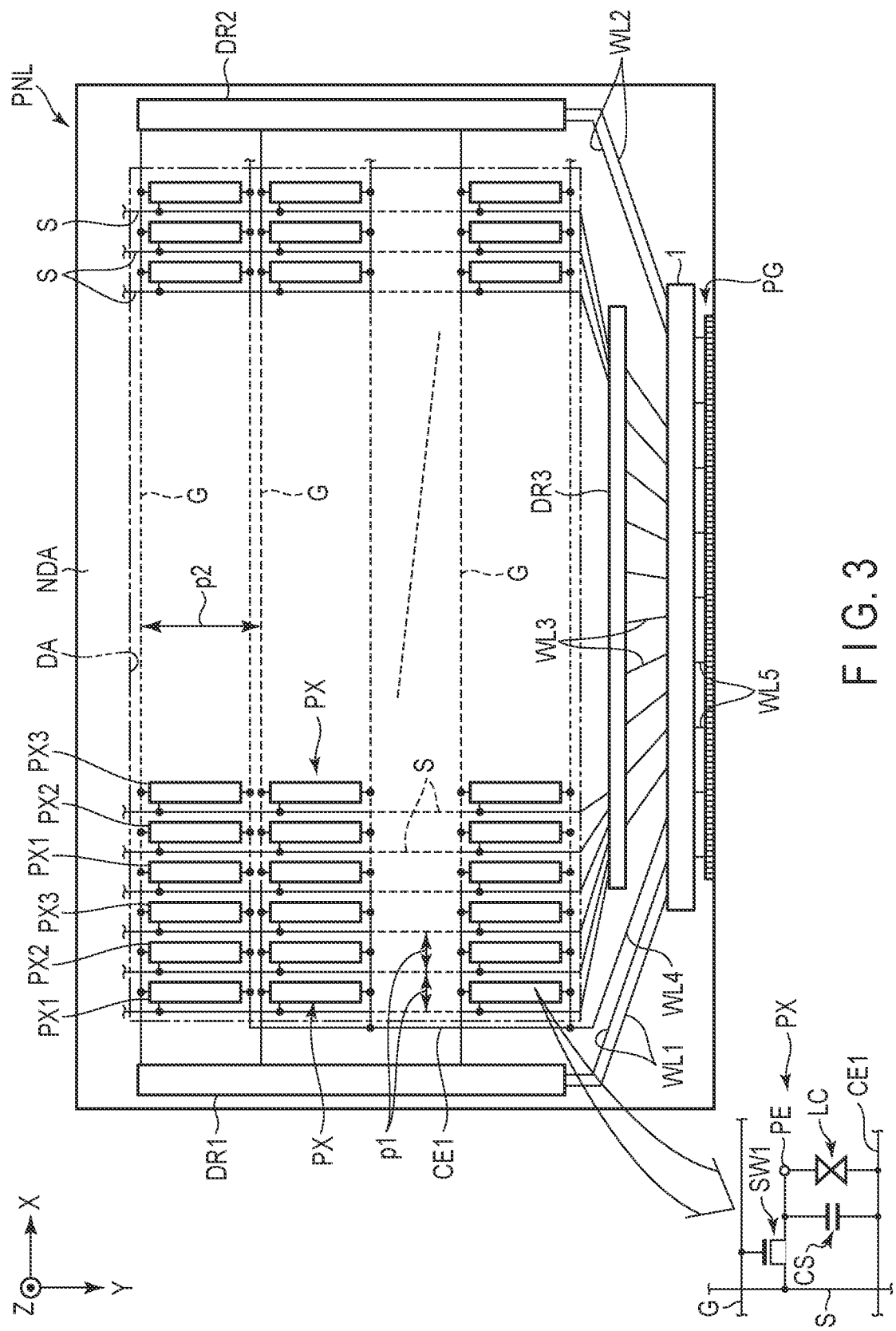
FIG. 3 is a circuit diagram showing the liquid crystal display panel and a drive unit shown in FIG. 1, together with a circuit configuration of a single pixel.

FIG. 3 is a circuit diagram showing the liquid crystal display panel PNL and the drive unit 1 shown in FIG. 1, together with a circuit configuration of a single pixel PX. Note that, here, the drawing shows an example of the circuit diagram of the liquid crystal display panel PNL and the drive unit 1. Therefore, the circuit diagram of the liquid crystal display panel PNL and the drive unit 1 is not limited to the circuit diagram shown in FIG. 3.

As shown in FIG. 3, the liquid crystal display panel PNL comprises a plurality of pixels PX, a plurality of gate lines G, a plurality of source lines S, and a first common electrode CE1 in the display area DA. The plurality of pixels PX are arranged in a matrix in the first direction X and the second direction Y. Each pixel PX includes a first color pixel PX1, a second color pixel PX2, and a third color pixel PX3. Needless to say, the first, second, and third colors are different from each other. In the present embodiment, the first color is red, the second color is green, and the third color is blue.

In the display area DA, the plurality of gate lines G extend in the first direction X and are lined up at intervals in the second direction Y, and the plurality of source lines S extend in the second direction Y and are lined up at intervals in the first direction X. In the non-display area NDA, the liquid crystal display panel PNL includes a first driver DR1, a second driver DR2, and a third driver DR3. In the present embodiment, the first driver DR1 and the second driver DR2 sandwich the display area DA in the first direction X and function as gate line drive circuits, respectively. The third driver DR3 functions as a select circuit. The first driver DR1, the second driver DR2, and the third driver DR3 are not external circuits such as the drive unit 1, but are built-in circuits including a switching element SW2 formed on a first insulating substrate 10 as described later.

Each of the gate lines G extends into the non-display area NDA and is connected to the first driver DR1 and the second driver DR2. However, the liquid crystal display panel PNL does not have to comprise both the first driver DR1 and the second driver DR2, and may comprise at least one of the first driver DR1 and the second driver DR2. Each of the source lines S extends into the non-display area NDA and is connected to the third driver DR3. The first common electrode CE1 is shared by the plurality of pixels PX.

The first driver DR1 is electrically connected to the drive unit 1 via a wiring line WL1. The second driver DR2 is electrically connected to the drive unit 1 via a wiring line WL2. The third driver DR3 is electrically connected to the drive unit 1 via a wiring line WL3. The first common electrode CE1 is connected to a common electrode drive circuit in the drive unit 1 via a wiring line WL4. The drive unit 1 is electrically connected to an outer lead bonding pad group (OLB pad group) PG of the liquid crystal display panel PNL via a wiring line WL5. Note that the above wiring substrate 2 shown in FIG. 1 is electrically connected to the OLB pad group PG. Various signals and voltages are given to the drive unit 1 via the wiring substrate 2.

Note that, unlike the present embodiment, the above common electrode drive circuit may be located in the non-display area NDA independently of the drive unit 1 and electrically connected to the drive unit 1 via wiring. Alternatively, the third driver DR3 may be incorporated within the drive unit 1 without being independent of the drive unit 1.

Each pixel PX comprises a switching element SW1, a pixel electrode PE, a first common electrode CE1, a liquid crystal layer LC, etc. The switching element SW1 is configured by a thin-film transistor (TFT) and is electrically connected to the gate line G and the source line S. The pixel electrode PE is electrically connected to the switching element SW1. The pixel electrode PE of each pixel PX faces the first common electrode CE1, respectively. The liquid crystal layer LC is driven by an electric field generated between the pixel electrode PE and the first common electrode CE1. A storage capacitor CS is coupled to the pixel electrode PE. The storage capacitor CS is, for example, formed between the first common electrode CE1 or an electrode electrically connected to the first common electrode CE1 and the pixel electrode PE or an electrode electrically connected to the pixel electrode PE.

Here, although the description of a detailed configuration of the pixel PX is omitted, the pixel PX has a configuration that corresponds to a display mode using a lateral electric field along a main surface of the array substrate AR. The main surface of the array substrate AR here refers to a surface parallel to an X-Y plane defined by the first direction X and the second direction Y.

The plurality of source lines S are lined up in the first direction X at a first pitch p1. The plurality of gate lines G are lined up in the second direction Y at a second pitch p2.

Figure 4:
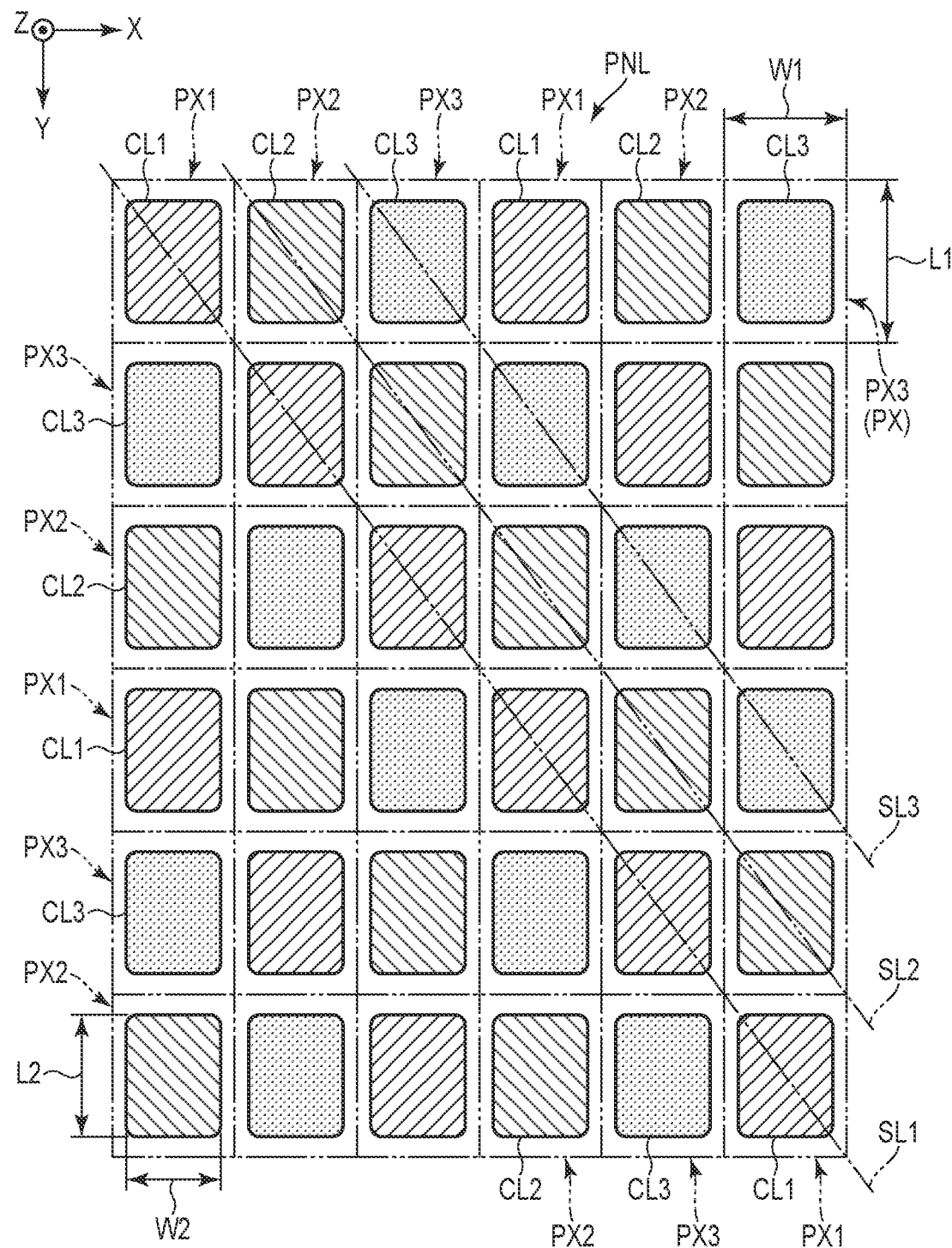
FIG. 4 is a plan view showing a pixel array in the liquid crystal display panel.

FIG. 4 is a plan view showing a pixel PX array in the liquid crystal display panel PNL. As shown in FIG. 4, the liquid crystal display panel PNL comprises a color filter CF. The color filter CF includes colored layers CL in multiple colors. In the present embodiment, the colored layers CL in multiple colors include a plurality of first color layers CL1, a plurality of second color layers CL2, and a plurality of third color layers CL3. In the drawing, the first color layer CL1 is shown by an upward-sloping diagonal line, the second color layer CL2 is shown by a downward-sloping diagonal line, and the third color layer CL3 is shown by a dot pattern.

The plurality of pixels PX include a plurality of first color pixels PX1, a plurality of second color pixels PX2, and a plurality of third color pixels PX3. The plurality of first color pixels PX1 each comprise the first color layer CL1. The plurality of second color pixels PX2 each comprise the second color layer CL2. The plurality of third color pixels PX3 each comprise the third color layer CL3.

Among the plurality of pixels PX, in each row of the plurality of pixels PX, the first color pixel PX1, the second color pixel PX2, and the third color pixel PX3 are lined up in the first direction X repeatedly in this order. Among the plurality of pixels PX, in each column of the plurality of pixels PX, the first color pixel PX1, the third color pixel PX3, and the second color pixel PX2 are lined up in the second direction Y repeatedly in this order.

Here, a virtual straight line extending in directions inclined in the first direction X and the second direction Y is referred to as a straight line SL1. A virtual straight line parallel to the straight line SL1 and spaced from the straight line SL1 is referred to as a straight line SL3. A virtual straight line parallel to the straight line SL1 and located between the straight line SL1 and the straight line SL3 is referred to as a straight line SL2. The plurality of first color pixels PX1 are lined up on the straight line SL1. The plurality of second color pixels PX2 are lined up on the straight line SL2. The plurality of third color pixels PX3 are lined up on the straight line SL3.

The fineness of the plurality of pixels PX in the display area DA of the liquid crystal display panel PNL is 2000 ppi (pixels per inch) or higher. In the present embodiment, the above fineness is 2015 ppi. The pixel PX has a width W1, which is the distance in the first direction X, and a length L1, which is the distance in the second direction Y. Note that the width W1 corresponds to the first pitch p1 in FIG. 3, and the length L1 corresponds to the second pitch p2 in FIG. 3. The colored layer CL has a width W2, which is the distance in the first direction X, and a length L2, which is the distance in the second direction Y.

In the present embodiment, the width W1 is 6.3 μm, the length L1 is 8.4 μm, the width W2 is 4.9 μm, and the length L2 is 6.3 μm.

Figure 5:
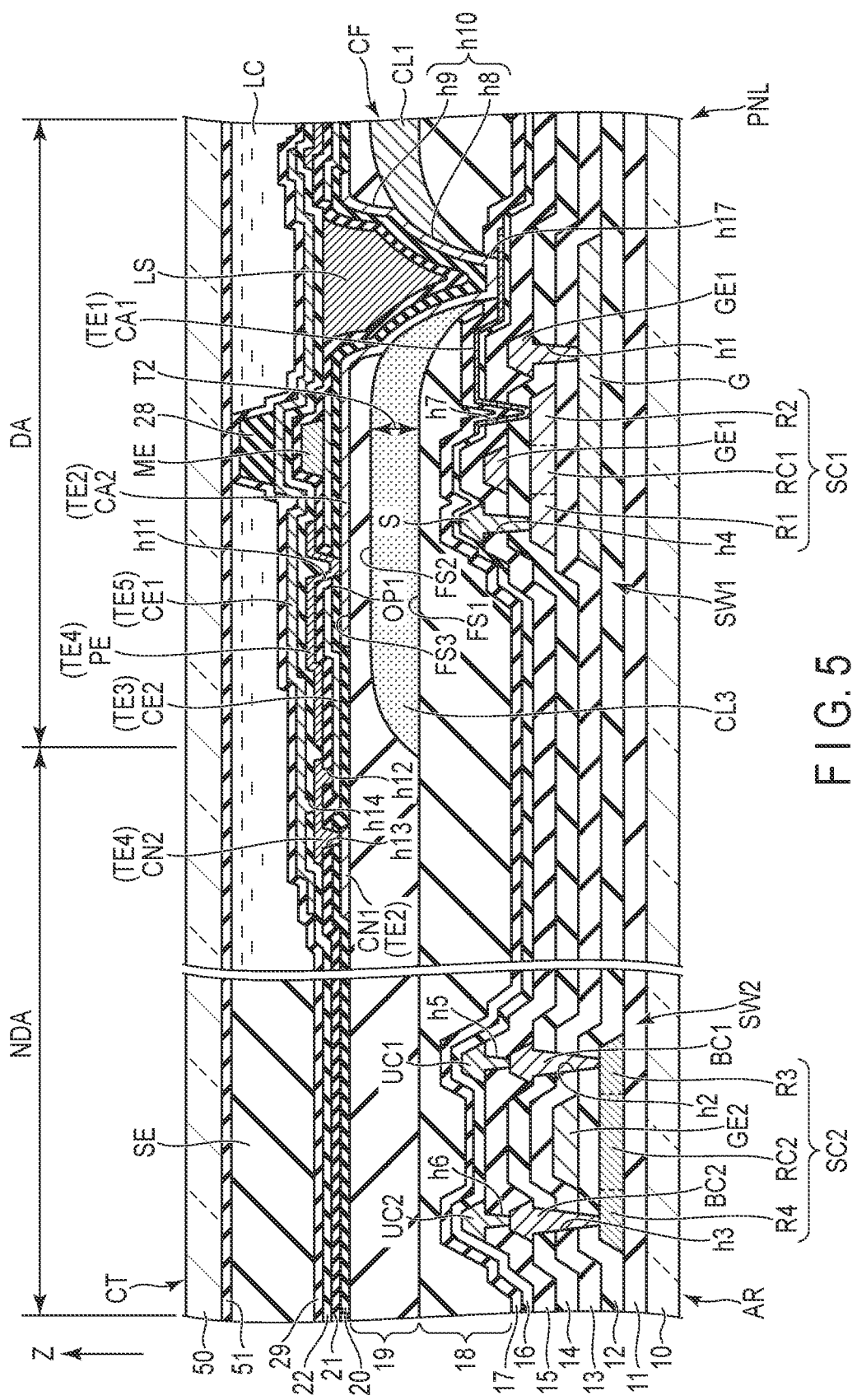
FIG. 5 is a cross-sectional view showing a configuration of display and non-display areas of the above liquid crystal display panel.

FIG. 5 is a cross-sectional view showing a configuration of the display area DA and non-display area NDA of the liquid crystal display panel PNL. In FIG. 5, a stacking order in the third direction Z is illustrated. Note that relative positional relationships between members in a direction orthogonal to the third direction Z may differ from those in the example of FIG. 4.

As shown in FIG. 5, the array substrate AR comprises a first insulating substrate 10 such as a light-transparent glass substrate or a flexible resin substrate. The array substrate AR further comprises insulating layers 11 to 22, the switching element SW1, the switching element SW2, a plurality of conductive layers, a light-shielding material LS, a spacer 28, and an alignment film 29.

The insulating layer 11 is provided on the first insulating substrate 10. For example, the insulating layer 11 is configured by a stacked layer body of an insulating layer formed of silicon oxide (SiO) and an insulating layer formed of a silicon nitride (SiN). The thickness of the insulating layer 11 is, for example, 500 nm or less.

A semiconductor layer SC2 is provided on the insulating layer 11 and is located in the non-display area NDA. As a polycrystalline silicon, the semiconductor layer SC2 is formed of, for example, low-temperature polycrystalline silicon. The thickness of the semiconductor layer SC2 is, for example, 50 nm or less. The semiconductor layer SC2 includes a third area R3, a fourth area R4, and a channel area RC2 between the third area R3 and the fourth area R4.

The liquid crystal display device DSP is configured in a manner that, although light is incident from the illumination device IL to the display area DA of the liquid crystal display panel PNL, light is not incident from the illumination device IL to the non-display area NDA of the liquid crystal display panel PNL. Therefore, a light-shielding portion is not provided under the semiconductor layer SC2. However, the light-shielding portion may be provided under the semiconductor layer SC2, in which case the light-shielding portion will be formed between the insulating layer 11 and the first insulating substrate 10.

The insulation layer 12 is provided on the insulating layer 11 and the semiconductor layer SC2, and covers the semiconductor layer SC2, etc. For example, the insulating layer 12 is formed of a silicon oxide film using tetraethoxysilane (TEOS). The thickness of the insulating layer 12 is, for example, 50 to 150 nm.

The gate line G and a gate electrode GE2 are provided on the insulating layer 12. The gate line G is located in the display area DA. The gate electrode GE2 is located in the non-display area NDA, and faces the channel area RC2 of the semiconductor layer SC2. The semiconductor layer SC2, the gate electrode GE2, etc., configures the switching element SW2, which is a TFT.

The gate line G and the gate electrode GE2 each have a two-layer stacked structure (Ti system/Al system). The gate line G and the gate electrode GE2 each include a lower layer formed of Al (aluminum) or a metallic material containing Al as a main component such as an alloy containing Al, and an upper layer formed of a Ti or a metallic material containing TI as a main component such as an alloy containing Ti. The thickness of each of the gate line G and the gate electrode GE2 is, for example, 500 nm or less.

As described above, in the gate line G and the gate electrode GE2, the lower layer located on the first insulating substrate 10 side is formed of a metallic material with Al as its main component. Therefore, the above lower layer can contribute to improving a recycling rate of light emitted from the illumination device IL.

The insulating layer 13 is provided on the insulating layer 12, the gate line G, and the gate electrode GE2, and covers the gate line G, the gate electrode GE2, etc. For example, the insulating layer 13 is configured by a stacked layer body of an insulating layer formed of SiO and an insulating layer formed of SiN. The thickness of the insulating layer 13 is, for example, 1000 nm or less.

A semiconductor layer SC1 is provided on the insulating layer 12 and is located in the display area DA. The semiconductor layer SC1 is formed of an oxide semiconductor (OS), which is a transparent semiconductor. Typical examples of oxide semiconductors include, for example, indium gallium zinc oxide (InGaZnO), indium gallium oxide (InGaO), indium zinc oxide (InZnO), zinc tin oxide (ZnSnO), zinc oxide (ZnO), and a transparent amorphous oxide semiconductor (TAOS), etc. In the present embodiment, the semiconductor layer SC1 is formed of indium gallium zinc oxide. The thickness of the semiconductor layer SC1 is, for example, 30 to 100 nm.

The semiconductor layer SC1 includes a first area R1, a second area R2, and a channel area RC1 between the first area R1 and the second area R2. In the present embodiment, at least the channel area RC1 of the semiconductor layer SC1 faces the gate line G. Therefore, the gate line G functions as a gate electrode of the switching element SW1, and as a light-shielding portion that shields light from the illumination device IL toward the semiconductor layer SC1.

Note that, unlike the present embodiment, the semiconductor layer SC1 may be formed of semiconductors other than oxide semiconductors such as amorphous silicon, polycrystalline silicon, and organic semiconductors.

The insulating layer 14 is provided on the insulating layer 13 and the semiconductor layer SC1, and covers the semiconductor layer SC1, etc. For example, the insulating layer 14 is formed of an inorganic insulating material such as SiO. The thickness of the insulating layer 14 is, for example, 50 to 150 nm. In the present embodiment, the insulating layer 14 may be referred to as the first insulating layer.

A gate electrode GE1 and lower contact electrodes BC1 and BC2 are provided on the insulating layer 14.

The gate electrode GE1 is located in the display area DA and faces the channel area RC1 of the semiconductor layer SC1. Furthermore, the gate electrode GE1 is in contact with the gate line G through a contact hole h1 formed in the insulating layers 13 and 14. Note that the contact hole h1 is located away from the semiconductor layer SC1.

The gate electrode GE1, the semiconductor layer SC1, etc., configure the switching element SW1, which is a TFT. In the present embodiment, since the gate line G functions as a gate electrode of the switching element SW1, the switching element SW1 has a dual-gate structure. However, the gate line G does not have to face the channel area RC1. In other words, the gate line G does not have to function as the gate electrode of the switching element SW1, and does not have to function as a light-shielding portion of the channel area RC1. In this case, the gate line G functions as a power feed line to feed power to the gate electrode GE1.

The lower contact electrodes BC1 and BC2 are located in the non-display area NDA. The lower contact electrode BC1 is in contact with the third area R3 through a contact hole h2 formed in the insulating layers 12 to 14. The lower contact electrode BC2 is in contact with the fourth area R4 through a contact hole h3 formed in the insulating layers 12 to 14. Note that the contact holes h2 and h3 are located away from the gate electrode GE2, respectively.

The gate electrode GE1 and the lower contact electrodes BC1 and BC2 each have a three-layer stacked structure (Ti system/Al system/Ti system). The gate electrode GE1 and the lower contact electrodes BC1 and BC2 each have a lower layer formed of a metallic material with Ti as its main component, an intermediate layer made of a metallic material with Al as its main component, and an upper layer made of a metallic material with Ti as its main component. The gate electrode GE1 and the lower contact electrodes BC1 and BC2 each have a thickness of, for example, 300 nm or less.

Note that, unlike the present embodiment, the array substrate AR may be further provided with a semiconductor cap layer. The semiconductor cap layer is a layer that is located between the insulating layer 14 and the gate electrode GE1 in an area facing the semiconductor layer SC1. The semiconductor cap layer faces at least the entire channel area RC1. For example, the semiconductor cap layer may face the entire semiconductor layer SC1. The semiconductor cap layer is formed of an oxide such as aluminum oxide (AlOx) and OS.

The insulating layer 15 is provided on the insulating layer 14, the gate electrode GE1, and the lower contact electrodes BC1 and BC2, and covers the gate electrode GE1 and the lower contact electrodes BC1 and BC2, etc. For example, the insulating layer 15 is configured by a stacked layer body of an insulating layer formed of SiO and an insulating layer formed of SiN. The thickness of the insulating layer 15 is, for example, 300 nm or less.

The source line S and upper contact electrodes UC1 and UC2 are provided on the insulating layer 15.

The source line S is located in the display area DA. The source line S is in contact with the first area R1 of the semiconductor layer SC1 through a contact hole h4 formed in the insulating layers 14 and 15. Note that the contact hole h4 is located away from the gate electrode GE1.

The upper contact electrodes UC1 and UC2 are located in the non-display area NDA. The upper contact electrode UC1 is in contact with the lower contact electrode BC1 through a contact hole h5 formed in the insulating layer 15. The upper contact electrode UC2 is in contact with the lower contact electrode BC2 through a contact hole h6 formed in the insulating layer 15.

The source line S and the upper contact electrodes UC1 and UC2 each have a three-layer stacked structure (Ti system/Al system/Ti system). The thickness of each of the source line S and the upper contact electrodes UC1 and UC2 is, for example 500 nm or less.

Note that, unlike the present embodiment, the array substrate AR may be configured without the contact holes h2 and h3 and the lower contact electrodes BC1 and BC2. In that case, the contact holes h5 and h6 penetrating the four layers of the insulating layers 12 to 15 are formed. However, it may be difficult to form the contact holes h5 and h6 at the same time as the contact hole h4.

Therefore, in the present embodiment, the contact holes h5 and h6 need only to penetrate the insulating layer 15, and the depth of the contact holes h5 and h6 can be made close to the depth of the contact hole h4. Therefore, in the present embodiment, the contact holes h5 and h6 can be formed satisfactorily at the same time as contact hole h4.

The insulating layer 16 is provided on the insulating layer 15, the source line S, and the upper contact electrodes UC1 and UC2, and covers the source line S, the upper contact electrodes UC1 and UC2, etc. The insulating layer 16 is formed of insulating materials such as SiO and SiN. In the present embodiment, the insulating layer 16 is formed of SiO. The thickness of the insulating layer 16 is, for example, 200 nm or more.

A contact electrode CA1 is provided on the insulating layer 16 and is located in the display area DA. The contact electrode CA1 is in contact with the second area R2 of the semiconductor layer SC1 through a contact hole h7 formed in the insulating layers 14 to 16. The contact electrode CA1 covers the entire semiconductor layer SC1 exposed to the contact hole h7. Note that the contact hole h7 is located away from the gate electrode GE1. In the present embodiment, the contact hole h7 may be referred to as a first contact hole.

The contact electrode CA1 is formed of transparent conductive materials having light transmittance such as indium tin oxide (ITO), OS, and indium zinc oxide (IZO). In the present embodiment, the contact electrode CA1 is formed of ITO. The thickness of the contact electrode CA1 is, for example, 50 nm or less.

From the above, an electrode on one side that contacts the semiconductor layer SC1 is a transparent electrode (contact electrode CA1), and another electrode that contacts the semiconductor layer SC1 is a metal electrode (source line S).

Since the insulating layer 16 covers the source line S, ITO does not exist in contact with the end portion of the source line S. This prevents an electrical short circuit with the source line S. In the present embodiment, a stacked layer body of the insulating layer 15 and the insulating layer 16 may be referred to as a second insulating layer.

The insulating layer 17 is provided on the insulating layer 16 and the contact electrode CA1, and covers the contact electrode CA1, etc. The insulating layer 17 is formed of insulating materials such as SiO and SiN. In the present embodiment, the insulating layer 17 is formed of SiN. The thickness of the insulating layer 17 is, for example, 50 nm or more. The insulating layer 17 has a function of shielding foreign substances such as moisture and gases from the color filter CF toward the first insulating substrate 10 side, which will be described later. Furthermore, the insulating layer 17 has a contact hole h17 that exposes the contact electrode CA1.

Note that the insulating layer 17 may be provided on the array substrate AR if necessary. For example, the insulating layer 18 located between the switching element SW1 and the color filter CF containing a pigment does not contain a pigment. Therefore, in a case where the insulating layer 18 has sufficient thickness and functions as a protective layer of the switching element SW1, the insulating layer 17 does not have to be provided on the array substrate AR.

The insulating layer 18 is located on the insulating layer 16. In the present embodiment, the insulating layer 18 is provided on the insulating layer 17. The insulating layer 18 is formed of an organic insulating material, for example, resin. The thickness of the insulating layer 18 is, for example, 3000 nm or less. However, the thickness of the insulating layer 18 is desired to be 1 μm or more. In the present embodiment, the thickness of the insulating layer 18 is 1 μm. Note that the thickness of the insulating layer 18 may be greater than 3000 nm.

The insulating layer 18 is not formed in an area overlapping the contact hole h17. The insulating layer 18, together with the contact electrode CA1 and the insulating layer 17, fills the contact hole h7. The insulating layer 18 has a first flat surface FS1 on a side facing the color filter CF. In the present embodiment, the insulating layer 17 and the insulating layer 18 may be referred to as a third insulating layer.

The color filter CF is provided on the insulating layer 18. The color filter CF includes colored layers CL in multiple colors. The color filter CF has a contact hole h8 that exposes the contact electrode CA1. Each colored layer CL has a second flat surface FS2 on a side facing the pixel electrode PE. Note that the second flat surface FS2 faces a contact electrode CA2 described later. A thickness T2 of each colored layer CL is, for example, 2000 nm or less. However, the thickness of the color filter CF may exceed 2000 nm. The thickness T2 corresponds to a distance in the third direction Z from the first flat surface FS1 to the second flat surface FS2.

The color filter CF includes the first color layer CL1, the second color layer described above (CL2), and the third color layer CL3. In the present embodiment, the first color layer CL1 is a red layer, the second color layer is a green layer, and the third color layer CL3 is a blue layer. The first color pixel PX1 includes the first color layer CL1, the second color pixel PX2 includes the second color layer, and the third color pixel PX3 includes the third color layer CL3.

Since the array substrate AR comprises the color filter CF, the liquid crystal display panel PNL has a so-called color filter-on-array (COA) structure. The structure of the COA contributes to higher definition of the pixel PX.

Here, the thickness T2 of the colored layer CL and the width W2 and the length L2 of the colored layer CL shown in FIG. 4 will be focused. The width W2 is five times or less the thickness T2, and the length L2 is five times or less the thickness T2. In the present embodiment, W2=4.9 μm and L2=6.3 μm. Furthermore, in the first color layer CL1, T2=2.00 μm, in the second color layer CL2, T2=1.84 μm, and in the third color layer CL3, T2=1.90 μm. From the above, in the present embodiment, in each of the first color layer CL1, the second color layer CL2, and the third color layer CL3, the width W2 is three times or less the thickness T2, and the length L2 is four times or less the thickness T2.

The insulating layer 19 is provided on the insulating layer 18 and the color filter CF. The insulating layer 19 is formed of an organic insulating material, for example, resin. The thickness of the insulating layer 19 is, for example, 3000 nm or less. However, the thickness of the insulating layer 19 may exceed 3000 nm. The insulating layer 19 has a contact hole h9 that is connected to the contact hole h8. In the present embodiment, the central axis of the contact hole h9 and the central axis of the contact hole h8 are located on the same straight line. However, the central axis of the contact hole h9 and the central axis of the contact hole h8 does not have to be located on the same straight line. The contact hole h8 and the contact hole h9 configure a contact hole h10. In the present embodiment, the contact hole h10 may be referred to as a second contact hole.

The insulating layer 19 is located between the color filter CF and the contact electrode CA2 described later, and has a third flat surface FS3 that is in contact with the contact electrode CA2. Note that the third flat surface FS3 is a surface of the insulating layer 19 on an opposite side of a side facing the color filter CF. Here, the first flat surface FS1, the second flat surface FS2, and the third flat surface FS3 are parallel to the X-Y plane.

In the present embodiment, the insulating layer 19 does not completely cover the inner surfaces of the color filter CF in the contact hole h8 and the insulating layer 17 in the contact hole h17. However, the insulating layer 19 may also completely cover the inner surfaces of the color filter CF and the insulating layer 17. In the present embodiment, the insulating layer 19 may be referred to as a fourth insulating layer.

The contact electrode CA2 and a connection electrode CN1 are provided on the insulating layer 18.

The contact electrode CA2 is located in the display area DA. The contact electrode CA2 is in contact with the contact electrode CA1 through the contact hole h10 and the contact hole h17. The contact electrode CA2 covers the inner surfaces of the insulating layer 19, the color filter CF, and the insulating layer 17 in the contact hole h10.

Furthermore, the contact electrode CA2 is in contact with the colored layer CL of adjacent pixels PX at the contact hole h8. In the present embodiment, as described later, the contact electrode CA2 does not completely cover the above-mentioned inner surfaces of the insulating layer 19, the color filter CF, and the insulating layer 17. However, the contact electrode CA2 may also completely cover the above-mentioned inner surfaces of the insulating layer 19, the color filter CF, and the insulating layer 17.

The connection electrode CN1 is located in the non-display area NDA. The connection electrode CN1 is located away from the contact electrode CA2.

The contact electrode CA2 and the connection electrode CN1 are formed of transparent conductive materials having light transmittance such as ITO, OS, and IZO. In the present embodiment, the contact electrode CA2 and the connection electrode CN1 are formed of ITO. The thickness of the contact electrode CA2 and the connection electrode CN1 is, for example, 50 nm or less, respectively.

The insulation layer 20 is provided on the insulating layer 19, the contact electrode CA2, and the connection electrode CN1, and covers the contact electrode CA2, the connection electrode CN1, etc. The insulating layer 20 is formed of an insulating material such as SiN. In the present embodiment, the insulating layer 20 is formed of SiN. The thickness of the insulating layer 20 is, for example, 50 to 150 nm. In the present embodiment, the insulating layer 20 may be referred to as a fifth insulating layer.

A second common electrode CE2 is provided on the insulating layer 20 and is located in the display area DA and the non-display area NDA. The second common electrode CE2 faces the contact electrode CA2 and forms a part of the above storage capacitor CS (FIG. 3). The second common electrode CE2 has an opening OP1 located in an area facing the contact electrode CA2.

The second common electrode CE2 is formed of transparent conductive materials having light transmittance such as ITO, OS, and IZO. In the present embodiment, the second common electrode CE2 is formed of ITO. The thickness of the second common electrode CE2 is, for example, 50 nm or less.

A metal layer ME is provided on the second common electrode CE2, and is in contact with the common electrode CE2. The metal layer ME is formed of a light-shielding material such as metal. In the present embodiment, the metal layer ME is formed of molybdenum-tungsten (MoW). The thickness of the metal layer ME is, for example, 10 to 150 nm.

The insulating layer 21 is provided on the insulating layer 20, the second common electrode CE2, and the metal layer ME, and covers the second common electrode CE2, the metal layer ME, etc. The insulating layer 21 is formed of an insulating material such as SiN. In the present embodiment, the insulating layer 21 is formed of SiN. The thickness of the insulating layer 21 is, for example, 50 to 150 nm. In the present embodiment, the insulating layer 21 may be referred to as a sixth insulating layer.

The light-shielding material LS is located on the contact hole h10. The light-shielding material LS is provided on the insulating layer 21 and is covered by the insulating layer 22. The light-shielding material LS, together with the contact electrode CA2, the insulating layer 20, and the insulating layer 21, fills the contact hole h10. The light-shielding material LS is formed of a colored material. In the present embodiment, the light-shielding material LS is formed of black resin. This can suppress or prevent undesirable light loss in an area overlapping the contact hole h10.

The pixel electrode PE and a connection electrode CN2 are provided on the insulating layer 21.

The pixel electrode PE is located in the display area DA. The pixel electrode PE is in contact with the contact electrode CA2 through a contact hole h11 formed in the insulating layers 20 and 21 and surrounded by the opening OP1. The pixel electrode PE faces the second common electrode CE2 and forms a part of the storage capacitor CS described above.

The connection electrode CN2 is located in the non-display area NDA. The connection electrode CN2 is located away from the pixel electrode PE. The connection electrode CN2, at one end, is in contact with the second common electrode CE2 through a contact hole h12 formed in the insulating layer 21. The connection electrode CN2, at the other end, is in contact with the connection electrode CN1 through a contact hole h13 formed in the insulating layers 20 and 21.

The pixel electrode PE and the connection electrode CN2 are formed of transparent conductive materials having light transmittance such as ITO, OS, and IZO. In the present embodiment, the pixel electrode PE and the connection electrode CN2 are formed of ITO. The thickness of the pixel electrode PE and the connection electrode CN2 is, for example, 50 nm or less, respectively.

The insulating layer 22 is provided on the insulating layer 21, the pixel electrode PE, and the connection electrode CN2 and covers the pixel electrode PE, the connection electrode CN2, etc. The insulating layer 22 is formed of an insulating material such as SiN. In the present embodiment, the insulating layer 22 is formed of SiN. The thickness of the insulating layer 22 is, for example, 50 to 150 nm. In the present embodiment, the insulating layer 22 may be referred to as a seventh insulating layer.

The first common electrode CE1 is provided on the insulating layer 22 and is located in the display area DA and the non-display area NDA. The first common electrode CE1 is in contact with the connection electrode CN2 through a contact hole h14 formed in the insulating layer 22. The first common electrode CE1 faces the pixel electrode PE and forms a part of the above-mentioned storage capacitor CS.

The first common electrode CE1 is formed of transparent conductive materials having light transmittance, such as ITO, OS, and IZO. In the present embodiment, the first common electrode CE1 is formed of ITO. The thickness of the first common electrode CE1 is, for example, 50 nm or less.

The spacer 28 is provided on the first common electrode CE1. The spacer 28 overlaps the metal layer ME. In the present embodiment, the spacer 28 is a columnar spacer formed of an organic insulating material. The height of the spacer 28 is, for example, 3000 nm or less.

The alignment film 29 is provided on the insulating layer 22, the first common electrode CE1, and the spacer 28.

On the other hand, the counter substrate CT comprises a second insulating substrate 50, such as a light-transparent glass or resin substrate, and an alignment film 51. The alignment film 51 is provided on a surface of the second insulating substrate 50 facing the alignment film 29.

Each of the alignment films 29 and 51 has a function of orienting the liquid crystal molecules contained in the liquid crystal layer LC in an initial alignment direction. As an example, each of the alignment films 29 and 51 is an optical alignment film to which optical alignment processing is performed where a polymer film such as polyimide is irradiated with ultraviolet light to become anisotropic. However, each of the alignment films 29 and 51 may be a rubbed alignment film to which rubbing processing is applied. Furthermore, one of the alignment films 29 and 51 may be an optical alignment film, and the other may be a rubbing alignment film.

As described above, the array substrate AR comprises a plurality of transparent conductive layers TE. The plurality of transparent conductive layers TE are located on the insulating layer 16 and are stacked while facing each other. Therefore, the storage capacitance CS with a desired capacity can be formed within a limited area in planar view. One of the plurality of transparent conductive layers TE is a pixel electrode PE. The pixel electrode PE is electrically connected to the second area R2 of the semiconductor layer SC1 via the remaining plurality of transparent conductive layers of the plurality of transparent conductive layers TE.

In the present embodiment, the array substrate AR comprises a first transparent conductive layer TE1, a second transparent conductive layer TE2, a third transparent conductive layer TE3, a fourth transparent conductive layer TE4, and a fifth transparent conductive layer TE5.

The contact electrode CA1 is configured by the first transparent conductive layer TE1. The contact electrode CA1 is located between the insulating layer 15 (insulating layer 16) and the insulating layer 18 (insulating layer 17) and is in contact with the second area R2 of the semiconductor layer SC1 through the contact hole h7 formed in the insulating layers 14, 15, and 16.

The contact electrode CA2 and the connection electrode CN1 are respectively configured by the second transparent conductive layer TE2. The contact electrode CA2 and the connection electrode CN1 are provided on the insulating layer 19 and is covered by the insulating layer 20. The contact electrode CA2 is located on the color filter CF and is in contact with the contact electrode CA1. The contact electrode CA2 is in contact with the contact electrode CA1 though the contact hole h10 formed in the insulating layer 19, the color filter CF, and the insulating layer 17.

The second common electrode CE2 is configured by the third transparent conductive layer TE3. The second common electrode CE2 is provided on the insulating layer 20, covered by the insulating layer 21, and faces the contact electrode CA2.

The pixel electrode PE and the connection electrode CN2 are each configured by the fourth transparent conductive layer TE4. The pixel electrode PE is located on the contact electrode CA2. The pixel electrode PE is located on the insulating layer 21, covered by the insulating layer 22, faces the second common electrode CE2, and is electrically connected to the contact electrode CA2. The pixel electrode PE is in contact with the contact electrode CA2.

The first common electrode CE1 is configured by the fifth transparent conductive layer TE5. The first common electrode CE1 is provided on the insulating layer 22, is electrically connected to the second common electrode CE2, and faces the pixel electrode PE.

The contact electrode CA1, the contact electrode CA2, and the pixel electrode PE are electrically connected to each other and configure a first electrical system. For example, the pixel electrode PE is electrically connected to the second area R2 of the semiconductor layer SC1 via the contact electrode CA1 and the contact electrode CA2. The connection electrode CN1, the second common electrode CE2, the connection electrode CN2, and the first common electrode CE1 are electrically connected to each other and configure a second electrical system. The above first electrical system is electrically independent of the above second electrical system.

One of the plurality of pixels PX includes the semiconductor layer SC1, the gate electrode GE1, the colored layer CL, the contact electrode CA1, the contact electrode CA2, and the pixel electrode PE.

Figure 6:
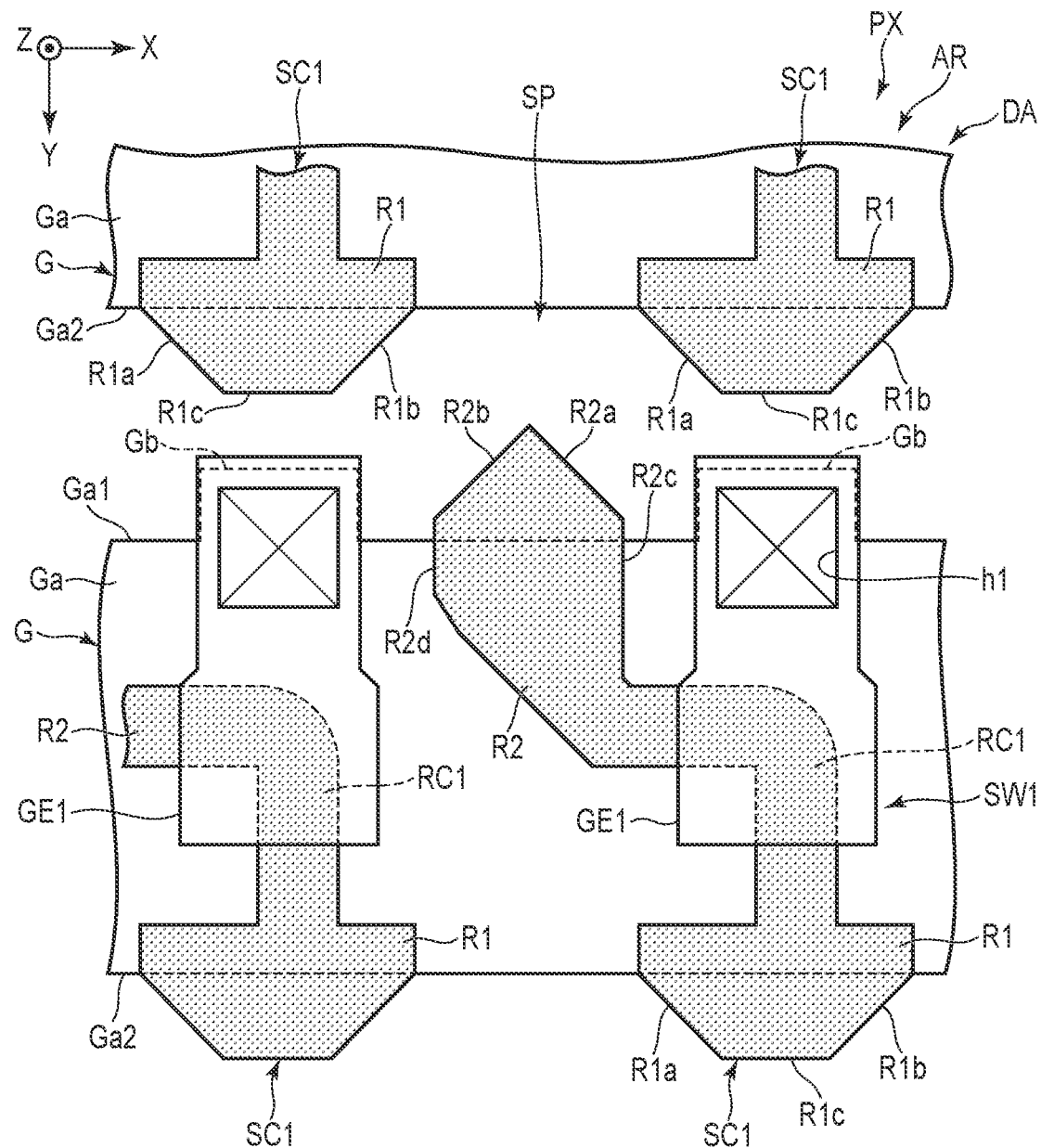
FIG. 6 is an enlarged plan view of a part of the display area of an array substrate of the liquid crystal display panel, showing a plurality of gate lines, a plurality of semiconductor layers, and a plurality of gate electrodes.

FIG. 6 is an enlarged plan view of a part of the display area DA of the array substrate AR, showing a plurality of gate lines G, a plurality of semiconductor layers SC1, and a plurality of gate electrodes GE1. In the drawing, the semiconductor layer SC1 is shown by a dot pattern.

As shown in FIG. 6, the gate line G includes a main line portion Ga and a plurality of protruding portions Gb formed integrally with the main line portion Ga. The main line portion Ga extends in the first direction X. The main line portion Ga includes side edges Ga1 and Gat which are parallel to the first direction X. In the display area DA, the width of the main line portion Ga in the second direction Y is constant over its entire length. The plurality of protruding portions Gb are located on the side edge Ga1 side of the main line portion Ga, protrude from the side edge Ga1 in a direction opposite to the second direction Y, and are lined up at intervals from each other in the first direction X. In the present embodiment, the protruding portion Gb has a rectangular shape. The protruding portion Gb is provided to secure an area that functions as a pedestal for the gate electrode GE1. In other words, the protruding portion Gb is provided to expand an area in which the contact hole h1 can be formed.

The gate electrode GE1 is electrically connected to one of the plurality of gate lines G and is located in an area overlapping the above gate line G. The gate electrode GE1 extends in the second direction Y and overlaps the main line portion Ga and the protruding portion Gb. The contact hole h1 is formed across the main line portion Ga and the protruding portion Gb. The contact hole h1 is formed with a gap in the contour of gate line G. The entire contact hole h1 is covered by the gate electrode GE1. Note that the position and size of the contact hole h1 shown in FIG. 6 are at the bottom of the contact hole h1 (an interface between the above gate line G and the above insulating layer 13).

The width of the gate electrode GE1 in the first direction X is not constant over its entire length. In the gate electrode GE1, the width of an area overlapping the semiconductor layer SC1 is larger than the width of an area overlapping the protruding portion Gb. In the present embodiment, the width of an area of the gate electrode GE1 overlapping the protruding portion Gb is the same as the width of the protruding portion Gb in the first direction X. The gate electrode GE1 is located without being displaced relative to the protruding portion Gb in the first direction X. In the second direction Y, the gate electrode GE1 extends beyond the edge of the protruding portion Gb and toward the adjacent gate line G side.

The channel area RC1 of the semiconductor layer SC1 overlaps the gate line G (main line portion Ga) and a wide portion of the gate electrode GE1. The channel area RC1 is bent in an area overlapping the gate electrode GE1 (wide portion). In the present embodiment, the channel area RC1 has a portion extending in the first direction X and a portion extending in the second direction Y, and is bent at an angle of 70° to 110°. Preferably, in the channel area RC1, a portion extending in the first direction X and a portion extending in the second direction Y are bent at an angle of 80° to 100°; more preferably, at an angle of 90°. The channel width is constant over the entire length of the channel area RC1. Some variation in the channel width due to manufacturing variations or the like is permitted as a constant range. The edge of the channel area RC1 on the first area R1 side is located with a gap from the side edge of gate electrode GE1 (wide portion) in the first direction X.

Even with a high-definition pixel PX, a sufficiently long channel length can be secured by including a bent channel area RC1 in the semiconductor layer SC1. Note that, in a case where a sufficiently long channel length cannot be secured, the channel area RC1 becomes conductive (metallized), making it difficult to obtain characteristics as a semiconductor.

When considering securing a sufficiently long channel length and the alignment of the semiconductor layer SC1 and the gate electrode GE1, it is more desirable that the gate electrode GE1 has a wide portion as described above. However, the gate electrode GE1 does not have to have the above wide portion; in other words, the width of the gate electrode GE1 in the first direction X may be constant over the entire length.

In the second direction Y, the channel area RC1 is located with a gap from the contact hole h1. By securing a margin between the contact hole h1 and the channel area RC1, the contact hole h1 can be prevented from overlapping the channel area RC1. This can avoid a situation in which the gate electrode GE1 and the semiconductor layer SC1 come into contact with each other and are electrically short-circuited.

The first area R1 of the semiconductor layer SC1 has an expansion portion extended in the second direction Y and located across the side edge Gat. In an area off the gate line G, the expansion portion of the first area R1 has a first side R1a, a second side R1b, and a third side R1c between the first side R1a and the second side R1b, and has a trapezoidal shape. The third side R1c is parallel to the first direction X, and is located with a gap from the contact hole h1 in the second direction Y. By securing a margin between the contact hole h1 and the first area R1, it is possible to avoid a situation where the adjacent pixels in the second direction are electrically short-circuited.

In addition, a plurality of first areas R1 (expansion portions) lined up in the first direction X are provided at intervals in the first direction X.

The second area R2 of the semiconductor layer SC1 is bent in an area overlapping the gate line G (main line portion Ga). In the present embodiment, the second area R2 includes a portion extending in the first direction X and a portion extending in the second direction Y, and is bent at an angle of 70° to 110°. In addition, preferably, in the second area R2, a portion extending in the first direction X and a portion extending in the second direction Y are bent at an angle of 80° to 100°; more preferably, at an angle of 90°. The second area R2 has an expansion portion located across the side edge Gal. In an area off the gate line G, the expansion portion of the second area R2 has a first side R2a and a second side R2b, and has a triangular shape.

The first side R2a of the second area R2 faces the first side R1a of the upper right first area R1 with a gap therebetween. For example, the first side R2a is desired to be parallel to the first side R1a. The second side R2b of the second area R2 faces the second side R1b of the upper left first area R1 with a gap therebetween. For example, the second side R2b is desired to be parallel to the second side R1b.

As described above, the first area R1 has the first side R1a and the second side R1b, and the second area R2 has the first side R2a and the second side R2b, so that an insulation distance can be secured between the second area R2 and the first area R1 of another semiconductor layer SC1, and the expansion portions of each of the first area R1 and the second area R2 can be expanded efficiently.

Furthermore, the second area R2 of the semiconductor layer SC1 has a third side R2c continuous from the first side R2a, and a fourth side R2d continuous from the second side R2b. The third side R2c and the fourth side R2d are respectively parallel to the second direction Y and intersects the side edge Gal. The third side R2c faces the gate electrode GE1 (the gate electrode GE1 of the same pixel PX) adjacent to the right with a gap therebetween. The fourth side R2d faces the gate electrode GE1 (the gate electrode GE1 of the pixel PX adjacent to the left) adjacent to the left with a gap therebetween.

By securing a margin between the contact hole h1 and the second area R2, it is possible to prevent the gate electrode GE1 and the semiconductor layer SC1 from being electrically short-circuited. As described above, the semiconductor layer SC1 is formed by expanding as much as possible within a range in which the margin can be secured.

FIG. 7 is an enlarged plan view of a part of the display area DA of the array substrate AR, showing a plurality of gate lines G, a plurality of semiconductor layers SC1, a plurality of source lines S, and a plurality of contact electrodes CA1 (a plurality of first transparent conductive layers TE1).

As shown in FIG. 7, the contact hole h4 is formed in an area facing the expansion portion of the first area R1 of the semiconductor layer SC1. Note that the position and size of contact hole h4 shown in FIG. 6 are at the bottom of the contact hole h4 (an interface between the above semiconductor layer SC1 and the above insulating layer 14).

Each source line S extends in the second direction Y and intersects a plurality of gate lines G. The source line S overlaps the semiconductor layer SC1 and the above gate electrode GE1 (FIG. 6). Therefore, the gate electrode GE1 is located in an area overlapping the gate line G and the source line S. The channel area RC1 of the semiconductor layer SC1 bends at an area overlapping the gate line G and the source line S.

In the display area DA, the width of the source line S in the first direction X is constant over its entire length. In the present embodiment, it is desirable that, in the first direction X, the width of the source line S is the same as or smaller than the width of the protruding portion Gb in an area other than on the gate line G. The source line S covers the entire contact hole h4. One of the plurality of source lines S passes through the contact hole h4 and is electrically connected to the expansion portion of the first area R1.

From the above, the expansion portion of the first area R1 is provided to secure an area that functions as a pedestal for the source lines S.

An opening area OA of the pixel PX is surrounded by a pair of adjacent gate lines G and a pair of adjacent source lines S of the plurality of gate lines G and the plurality of source lines S. In the semiconductor layer SC1, a part of the expansion portion of the first area R1 and a part of the expansion portion of the second area R2 are located in the opening area OA, respectively.

As shown in FIG. 7, a width D2 in the second direction Y of the opening area OA is smaller than a width D1 in the second direction Y of the gate line G. In one example, the width of the opening area OA in the second direction Y is 3 nm, and the width of the gate line G in the second direction Y is 5 nm.

The contact hole h7 is formed in an area facing the expansion portion of the second area R2 of the semiconductor layer SC1. Note that the position and size of the contact hole h7 shown in FIG. 7 are at the bottom of the contact hole h7 (an interface between the above semiconductor layer SC1 and the above insulating layer 14).

The pixel PX includes the contact electrode CA1. A plurality of contact electrodes CA1 are arranged in a matrix in the first direction X and the second direction Y. The contact electrode CA1 has a rectangular shape. The contact electrode CA1 has a first side CA1a and a second side CA1b parallel to the first direction X and a third side CA1c and a fourth side CA1d parallel to the second direction Y.

The first side CA1a is located in the opening area OA of its own pixel PX.

The second side CA1b overlaps the gate line G electrically connected to the switching element SW1 of its own pixel PX.

The third side CA1c is located on the right side (the source line S side electrically connected to the switching element SW1 of its own pixel PX) of the contact hole h7 of its own pixel PX.

The fourth side CA1d is located on the left side of the contact hole h7 of its own pixel PX.

From the above, the contact electrode CA1 and the contact hole h7 are located in the opening area OA together with the expansion portion of the second area R2.

The third side CA1c may be located between the contact hole h7 of its own pixel PX and the source line S on the right side, and may overlap the source line S on the right side. The fourth side CA1d may be located between the contact hole h7 of its own pixel PX and the source line S on the left side, and may overlap the source line S on the left side.

In the present embodiment, the third side CA1c overlaps the left side of the source line S on the right side, and the fourth side CA1d overlaps the right side of the source line S on the left side. In other words, in the first direction X, the width of the contact electrode CA1 and the width of the opening area OA are the same.

The first side CA1a, the second side CA1b, the third side CA1c, and the fourth side CA1d are respectively located with a gap from contact hole h7. By securing margins from the contact hole h7 to the first side CA1a, the second side CA1b, the third side CA1c, and the fourth side CA1d, respectively, the entire contact hole h7 can be covered by the contact electrode CA1. This can avoid a situation where the second area R2 (semiconductor layer SC1) disappears in the manufacturing process.

A gap between the contact hole h7 and the first side CA1a in the second direction Y, a gap between the contact hole h7 and the third side CA1c in the first direction X, and a gap between the contact hole h7 and the fourth side CA1d in the first direction X are preferably the same. A gap between the contact hole h7 and the second side CA1b in the second direction Y is larger than each of these gaps. This allows a contact area of the contact electrode CA1 and the contact electrode CA2 to be secured between the contact hole h7 and the second side CA1b.

Figure 8:
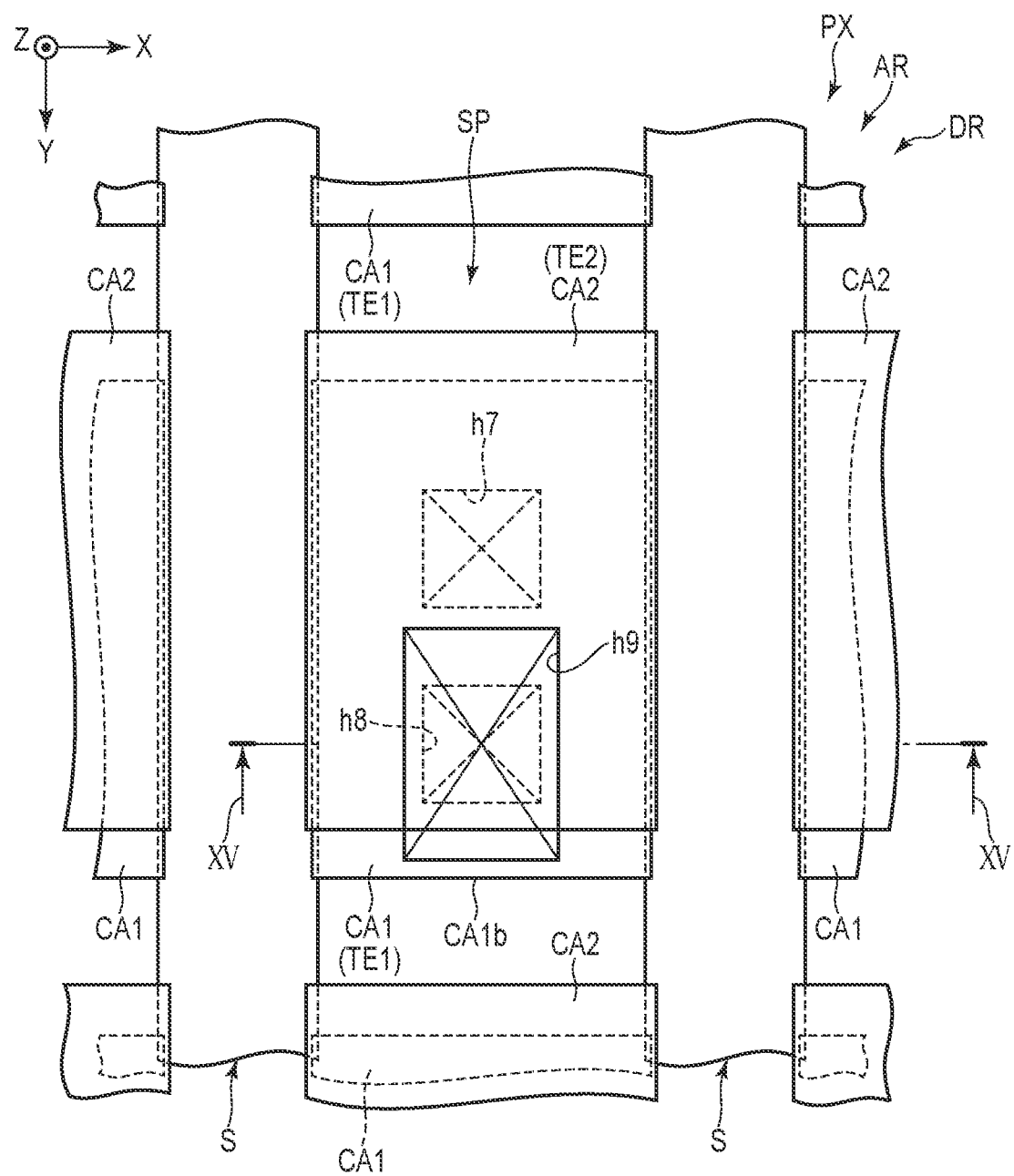
FIG. 8 is an enlarged plan view of a part of the display area of the array substrate above, showing a plurality of source lines and a plurality of contact electrodes.

FIG. 8 is an enlarged plan view of a part of the display area DA of the array substrate AR, showing a plurality of source lines S, a plurality of contact electrodes CA1 (a plurality of first transparent conductive layers TE1), and a plurality of contact electrodes CA2 (a plurality of second transparent conductive layers TE2).

As shown in FIG. 8, the contact hole h8 is located between the contact hole h7 and the second side CA1b and is formed in an area facing the contact electrode CA1. In the second direction Y, the contact hole h8 is located away from the contact hole h7. However, a part of the contact hole h8 may overlap the contact hole h7. The contact hole h9 overlaps the contact hole h8. The size of the contact hole h9 is larger than that of the contact hole h8.

The position and size of the contact hole h8 shown in FIG. 8 are at the bottom of the contact hole h8 (an interface between the contact electrode CA1 and the insulating layer 17 above). The position and size of the contact hole h9 shown in FIG. 8 are at the bottom of the contact hole h9. In the present embodiment, the bottom of the contact hole h9 is located at the interface between the above insulating layer 19 and the above color filter CF.

Although omitted in FIG. 8, the contact hole h7, the contact hole h8, and the contact hole h9 in FIG. 8 also overlap the gate line G in the manner shown in FIG. 5, FIG. 6, and FIG. 7.

However, as mentioned above, the insulating layer 19 may completely cover the inner surfaces of the color filter CF and the insulating layer 17 in the contact hole h8. In that case, the bottom of the contact hole h9 is located at the interface between the contact electrode CA1 and the insulating layer 19.

The pixel PX includes the contact electrode CA2. A plurality of contact electrodes CA2 are arranged in a matrix in the first direction X and the second direction Y. The contact electrode CA2 has a rectangular shape. The contact electrode CA2 covers a part of the contact hole h9. The contact electrode CA2 should be partially connected to the contact electrode CA1 via the contact holes h8 and h9. At the time of manufacturing the contact electrode CA2, the ITO of the contact electrode CA1 is crystallized. Therefore, even if the contact electrode CA2 does not cover the entire contact hole h9, the contact electrode CA1 would not disappear.

However, the contact electrode CA2 may also cover the entire contact hole h9.

Furthermore, as shown in FIG. 5, in the contact hole h8, the contact electrode CA2 is in contact with the first color layer CL1 and the third color layer CL3 having a color different from that of the first color layer CL1. Explaining FIG. 8 with reference to FIG. 5, the contact hole h7 overlaps the third color layer CL3, and the contact hole h8 is an opening of the color filter CF formed in an area between the first color layer CL1 and the third color layer CL3. This opening of the color filter CF overlaps the gate line G. The opening of the color filter CF may be formed at a boundary between different color layers.

The right side of the contact electrode CA2 may be located between the contact hole h9 of its own pixel PX and the source line S on the right side, and may overlap with the source line S on the right side. The left side of the contact electrode CA2 may be located between the contact hole h9 of its own pixel PX and the source line S on the left side, and may overlap with the source line S on the left side.

In the present embodiment, the right side of the contact electrode CA2 overlaps the left side of the source line S on the right side, and the left side of the contact electrode CA2 overlaps the right side of the left source line S on the left side. In other words, the width of contact electrode CA2 is the same as that of the contact electrode CA1 in the first direction X.

For example, the contact electrode CA2 has an upper end portion that does not overlap the contact electrode CA1. On the other hand, the contact electrode CA1 has a lower end portion that does not overlap the contact electrode CA2.

Figure 9:
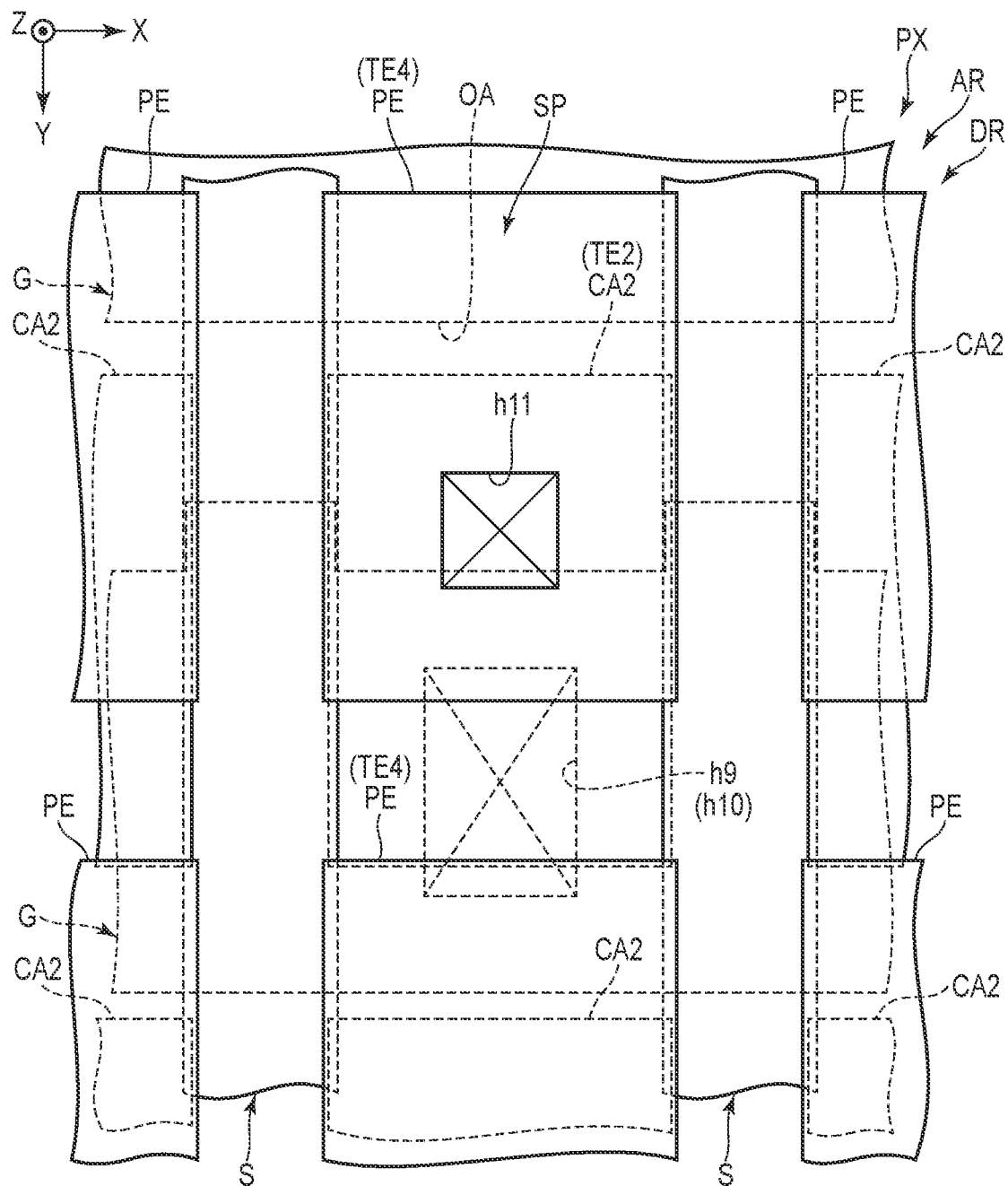
FIG. 9 is an enlarged plan view of a part of the display area of the array substrate above, showing a plurality of gate lines, a plurality of source lines, a plurality of contact electrodes, and a plurality of pixel electrodes.

FIG. 9 is an enlarged plan view of a part of the display area DA of the array substrate AR, showing a plurality of gate lines G, a plurality of source lines S, a plurality of contact electrodes CA2 (a plurality of second transparent conductive layers TE2), and a plurality of pixel electrodes PE (a plurality of fourth transparent conductive layers TE4).

As shown in FIG. 9, the contact hole h11 is located in an area overlapping the contact electrode CA2. In the present embodiment, a part of the contact hole h11 is located in the opening area OA. The contact hole h11 is located with a gap on each side of the contact electrode CA2.

The pixel PX includes the pixel electrode PE. A plurality of pixel electrodes PE are arranged in a matrix in the first direction X and the second direction Y. The pixel electrode PE has a rectangular shape. The pixel electrode PE covers the entire contact hole h11. A part of the pixel electrode PE overlaps the contact hole h10 (h9).

The right side of the pixel electrode PE may be located between the contact hole h11 of its own pixel PX and the source line S on the right side, and may overlap with the source line S on the right side. The left side of the pixel electrode PE may be located between the contact hole h11 of its own pixel PX and the source line S on the left side, and may overlap with the source line S on the left side.

In the present embodiment, the right side of the pixel electrode PE overlaps the left side of the source line S on the right side, and the left side of the pixel electrode PE overlaps the right side of the source line S on the left side. In other words, the width of the pixel electrode PE is the same as that of the contact electrode CA2 in the first direction X.

In the present embodiment, for example, the pixel electrode PE has an upper end portion that does not overlap the contact electrode CA2. On the other hand, the contact electrode CA2 has a lower end portion that does not overlap the pixel electrode PE.

Figure 10:
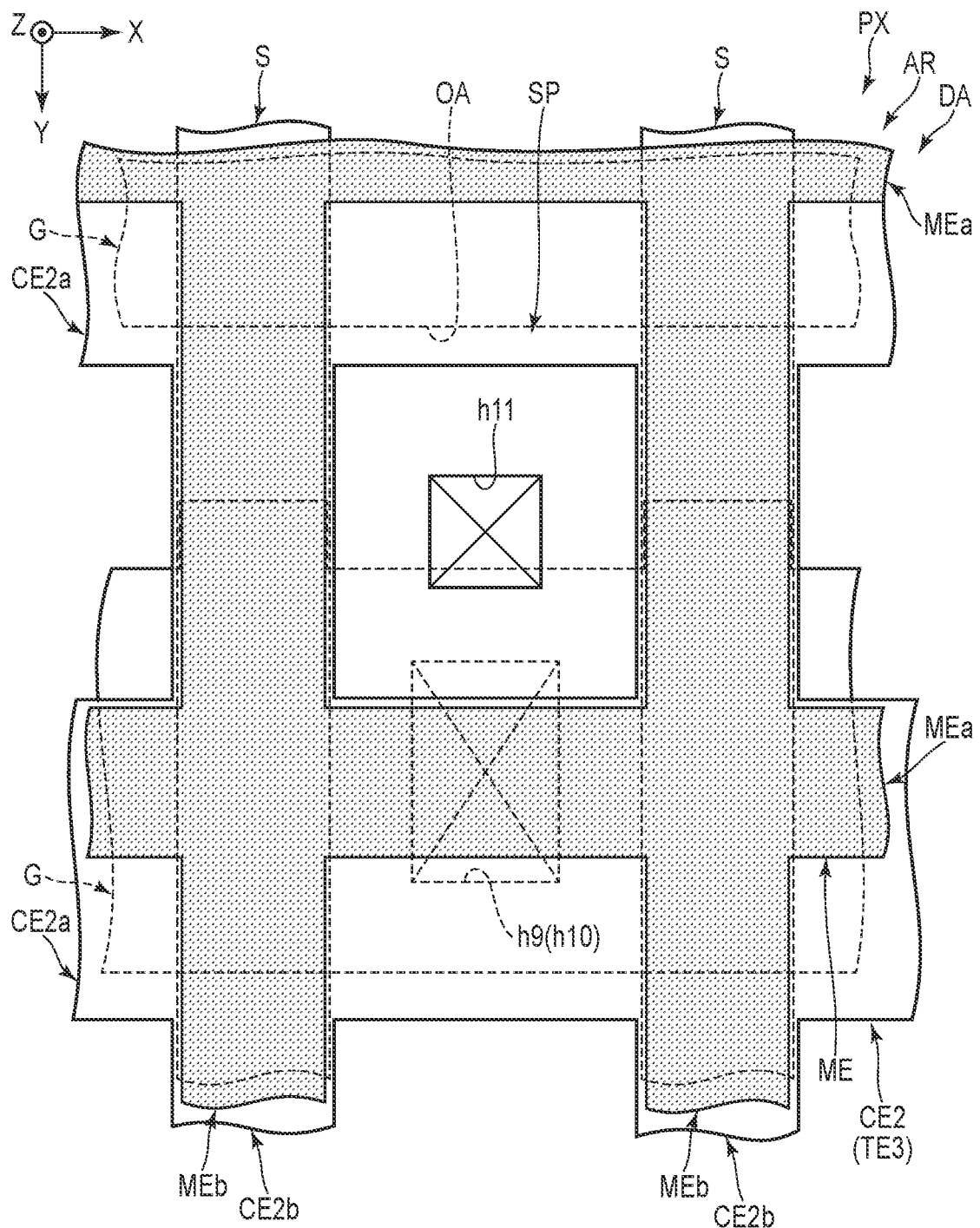
FIG. 10 is an enlarged plan view of a part of the display area of the array substrate above, showing a plurality of gate lines, a plurality of source lines, a second common electrode, and a metal layer.

FIG. 10 is an enlarged plan view of a part of the display area DA of the array substrate AR, showing a plurality of gate lines G, a plurality of source lines S, the second common electrode CE2 (the third transparent conductive layer TE3), and the metal layer ME. In the drawing, the metal layer ME is shown by a dot pattern.

As shown in FIG. 10, the second common electrode CE2 is formed in a lattice pattern in the display area DA. The second common electrode CE2 is formed by integrating a plurality of first extended portions CE2a extended in the first direction X and lined up at intervals in the second direction Y and a plurality of second extended portions CE2b extended in the second direction Y and lined up at intervals in the first direction X. A pair of adjacent first extended portions CE2a and a pair of adjacent second extended portions CE2b surround the contact hole h11.

In addition, as shown in FIG. 10, the opening of the lattice-shaped second common electrode CE2 is larger than the opening area OA and smaller than the opening of the lattice-shaped metal layer ME.

In the second direction Y, the first extended portion CE2a is arranged so that a gap between the first extended portion CE2a and the contact hole h11 becomes constant. In the present embodiment, although the entire first extended portion CE2a does not overlap with the gate line G, it may also overlap with the gate line G.

In the first direction X, the second extended portion CE2b is arranged so that a gap between the second extended portion CE2b and the contact hole h11 becomes constant. In the present embodiment, the entire second extended portion CE2b overlaps the source line S. In the present embodiment, the width of the second extended portion CE2b in the first direction X is the same as the width of the source line S in the first direction X. However, the width of the second extended portion CE2b may be smaller or larger than the width of the source line S. The second common electrode CE2 is shared by a plurality of pixels PX.

The metal layer ME is formed in a lattice pattern in the display area DA. The metal layer ME is formed by integrating a plurality of first metal layers MEa extended in the first direction X and lined up at intervals in the second direction Y and a plurality of second metal layers MEb extended in the second direction Y and lined up at intervals in the first direction X. A pair of adjacent first metal layers MEa and a pair of adjacent second metal layers MEb surround the contact hole h11.

The width of the first metal layer MEa in the second direction Y is smaller than the width of the first extended portion CE2a. In the present embodiment, the entire first metal layer MEa overlaps with the first extended portion CE2a. In the first direction X, the second metal layer MEb is arranged so that a gap between the second metal layer MEb and the contact hole h11 becomes constant. In the present embodiment, the entire second metal layer MEb overlaps the source line S together with the second extended portion CE2b. In the present embodiment, the width of the second metal layer MEb in the first direction X is the same as the width of the source line S in the first direction X. However, the width of the second metal layer MEb may be smaller than the width of the source line S. Note that the width of the second metal layer MEb may be larger than the width of the source line S, but this is undesirable since it causes the opening area OA to shrink.

The metal layer ME functions as a light-shielding layer (so-called black matrix) surrounding the opening area OA.

Figure 11:
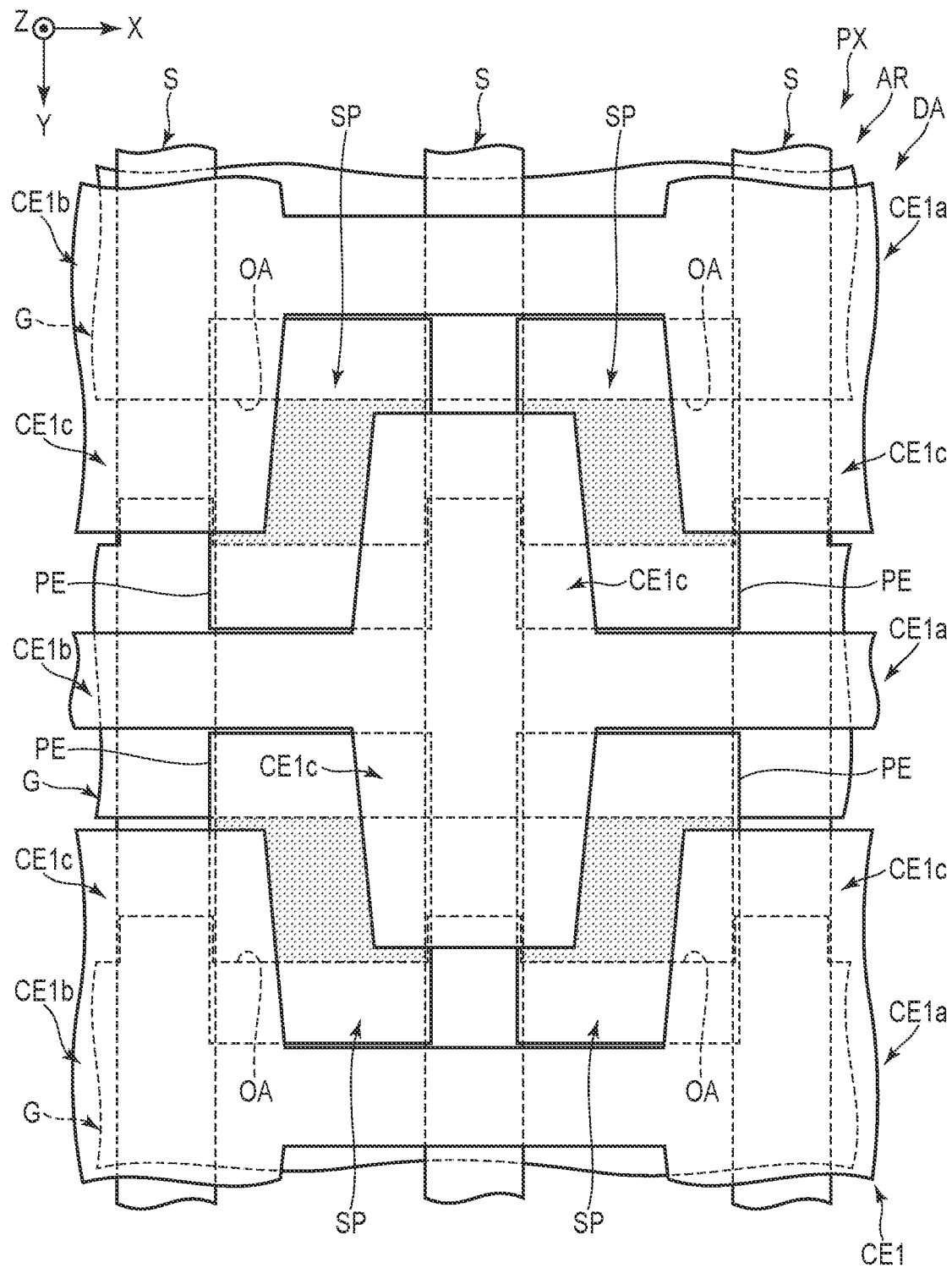
FIG. 11 is an enlarged plan view of a part of the display area of the array substrate above, showing a plurality of gate lines, a plurality of source lines, a plurality of pixel electrodes, and a first common electrode.

FIG. 11 is an enlarged plan view of a part of the display area DA of the array substrate AR, showing a plurality of gate lines G, a plurality of source lines S, a plurality of pixel electrodes PE, and the first common electrode CE1.

As shown in FIG. 11, the first common electrode CE1 includes a plurality of extended portions CE1a located in the display area DA. The plurality of extended portions CE1a each extend in the first direction X and are lined up at intervals in the second direction Y.

Each of the extended portions CE1a includes a main line portion CE1b and a plurality of protruding portions CE1c formed integrally with the main line portion CE1b.

The main line portion CE1b extends in the first direction X, and the entire main line portion CE1b overlaps with the gate line G. The width of the main line portion CE1b in the second direction Y is constant over its entire length.

The protruding portion CE1c is provided in an area overlapping the source line S, and protrudes from the main line portion CE1b in the second direction Y. The protruding portion CE1c is provided on both sides of the main line portion CE1b. The protruding portion CE1c has a shape that tapers as it moves away from the main line portion CE1b. In the present embodiment, the protruding portion CE1c has a trapezoidal shape.

The extended portion CE1a has a symmetry axis parallel to the first direction X and has a line symmetrical shape. In a pair of extended portions CE1a adjacent to each other in the second direction Y, a plurality of protruding portions CE1c of one of the extended portions CE1a and a plurality of protruding portions CE1c of the other extended portion CE1a are provided alternately in the first direction X.

Here, an area in which the pixel electrode PE, an area between the extended portions CE1a, and the opening area OA overlap is defined as a superposed area. In the drawing, the superposed area is shown by a dot pattern. A pair of superposed areas adjacent to each other in the first direction X is in a linearly symmetrical positional relationship with respect to a symmetry axis in the second direction Y. A pair of superposed areas adjacent to each other in the second direction Y is in a linearly symmetrical positional relationship with respect to a symmetry axis in the first direction X.

The above liquid crystal layer LC is driven by an electric field generated between the pixel electrode PE and the first common electrode CE1.

The configuration of the first common electrode CE1 is not limited to the configuration of the present embodiment, and can be variously modified. For example, the first common electrode CE1 may be configured in the manner as shown in FIG. 12. FIG. 12 is an enlarged plan view of a part of the display area DA of the array substrate AR according to a modified example of the present embodiment, showing a plurality of gate lines G, a plurality of source lines S, a plurality of pixel electrodes PE, and the first common electrode CE1. In FIG. 12, the configuration of other than the first common electrode CE1 is the same as in FIG. 11.

As shown in FIG. 12, the first common electrode CE1 includes a plurality of extended portions CE1a located in the display area DA. The plurality of extended portions CE1a each extend in the second direction Y and are lined up at intervals in the first direction X.

Each of the extended portions CE1a includes a main line portion CE1b, a plurality of first protruding portions CE1d formed integrally with the main line portion CE1b, and a plurality of second protruding portions CE1e formed integrally with the main line portion CE1b.

The main line portion CE1b extends in the second direction Y, and at least a part of the main line portion CE1b overlaps with the source line S. The width of the main line portion CE1b in the first direction X is constant over its entire length.

The first protruding portion CE1d is provided in the opening area OA and protrudes from the main line portion CE1b in the first direction X.

The second protruding portion CE1e is provided in an area overlapping the gate line G and protrudes from the main line portion CE1b in the first direction X.

The first protruding portion CE1d and the second protruding portion CE1e are provided on one side of the main line portion CE1b. The first protruding portion CE1d and the second protruding portion CE1e have shapes that taper as they move away from the main line portion CE1b. In the present embodiment, the first protruding portion CE1d and the second protruding portion CE1e have a trapezoidal shape. An angle formed by a side of the first protruding portion CE1d inclined at an acute angle in the first direction X and the first direction X is greater than an angle formed by a side of the second protruding portion CE1e inclined at an acute angle in the first direction X and the first direction X.

Again, an area in which the pixel electrode PE, an area between the extended portions CE1a, and the opening area OA overlap is defined as a superposed area, and is shown by a dot pattern in the drawing.

Figure 13:
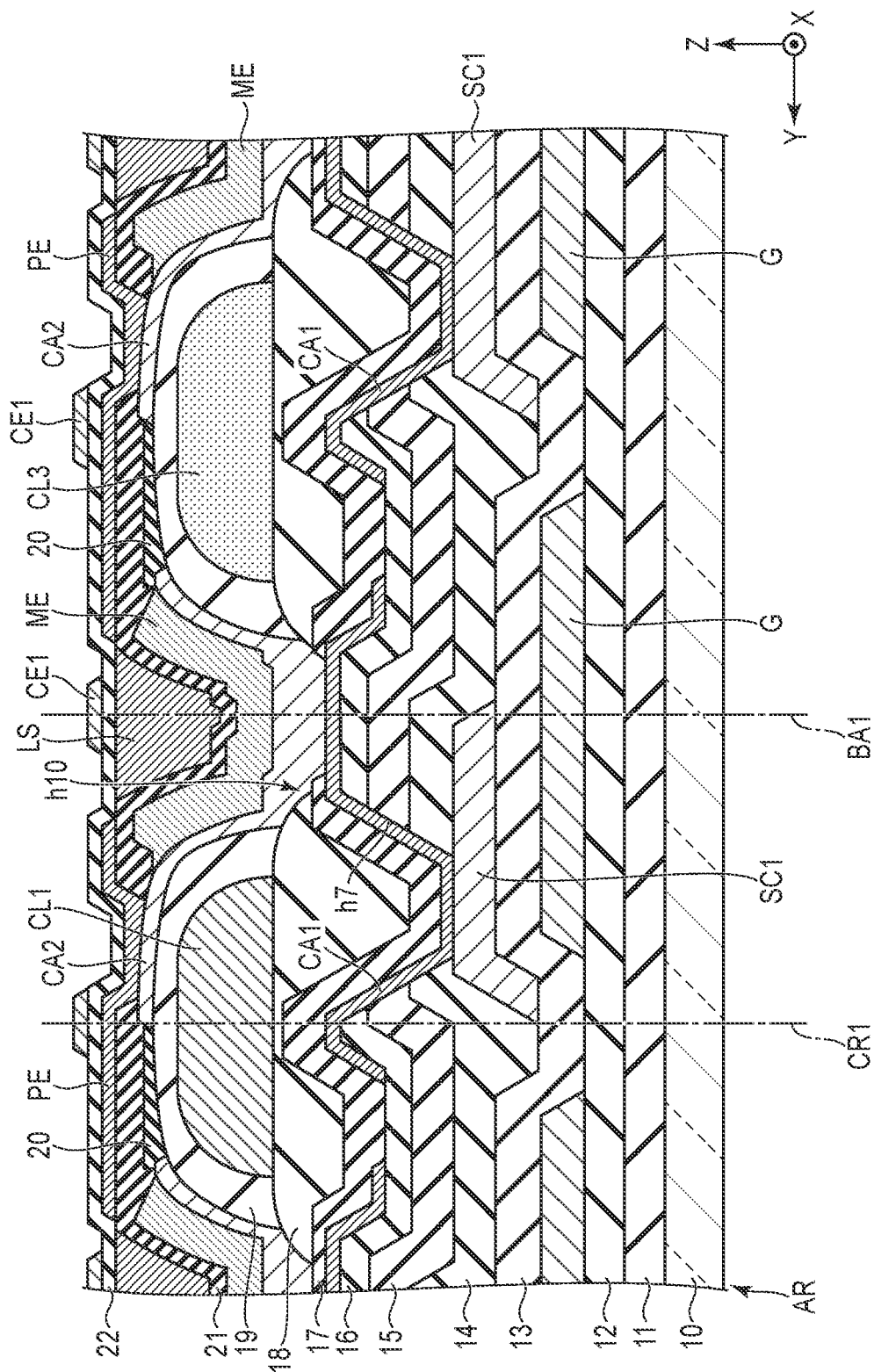
FIG. 13 is a cross-sectional view showing the array substrate along line XIII-XIII in FIG. 7.

FIG. 13 is a cross-sectional view showing the array substrate AR along line XIII-XIII in FIG. 7. In the drawing, the alignment film 29 is not shown.

As shown in FIG. 13, a center line CR1 is a virtual straight line in the third direction Z passing through the center of the opening area OA in the second direction Y. The colored layer CL, etc., are located on the center line CR1. A boundary line BA1 is a virtual straight line in the third direction Z passing through the boundary of pixels PX adjacent in the second direction Y. The contact hole h10, etc., are located on the boundary line BA1.

The contact hole h10 is formed in an area surrounded by the inner surfaces of the insulating layers 17, 18, and 19. The contact hole h10 is also filled with the metal layer ME in addition to the light-shielding material LS, etc. This can suppress or prevent undesirable light loss in an area overlapping the contact hole h10.

The interval of the colored layer CL in the second direction Y is, for example, 2.5 µm.

Figure 14:
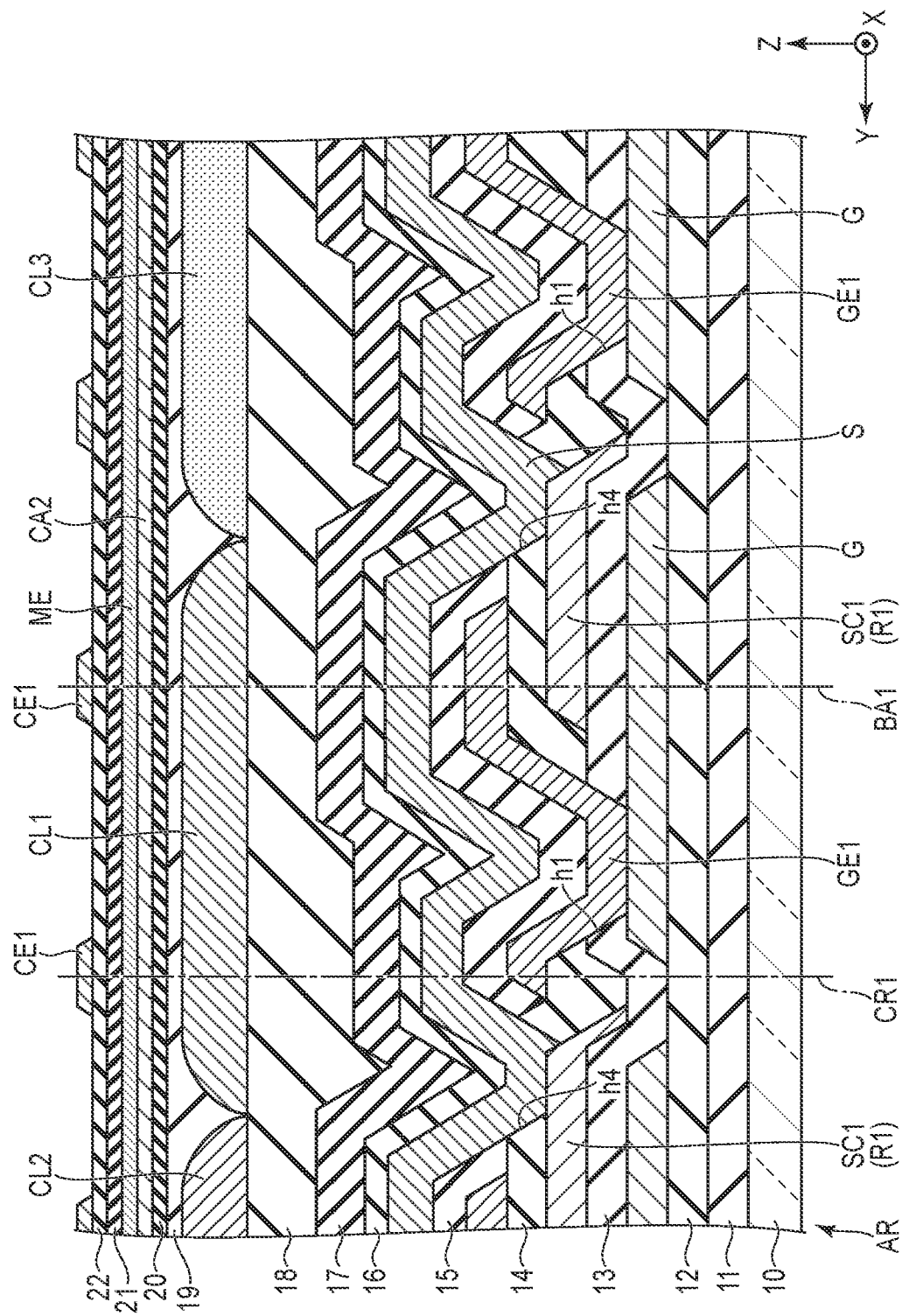
FIG. 14 is a cross-sectional view showing the array substrate along line XIV-XIV in FIG. 7.

FIG. 14 is a cross-sectional view showing the array substrate AR along line XIV-XIV in FIG. 7. In the drawing, the alignment film 29 is not shown.

As shown in FIG. 14, the gate electrode GE1 is in contact with the gate line G through the contact hole h1 formed in the insulating layers 13 and 14. The source line S is in contact with the first area R1 of the semiconductor layer SC1 through the contact hole h4 formed in the insulating layers 14 and 15.

Figure 15:
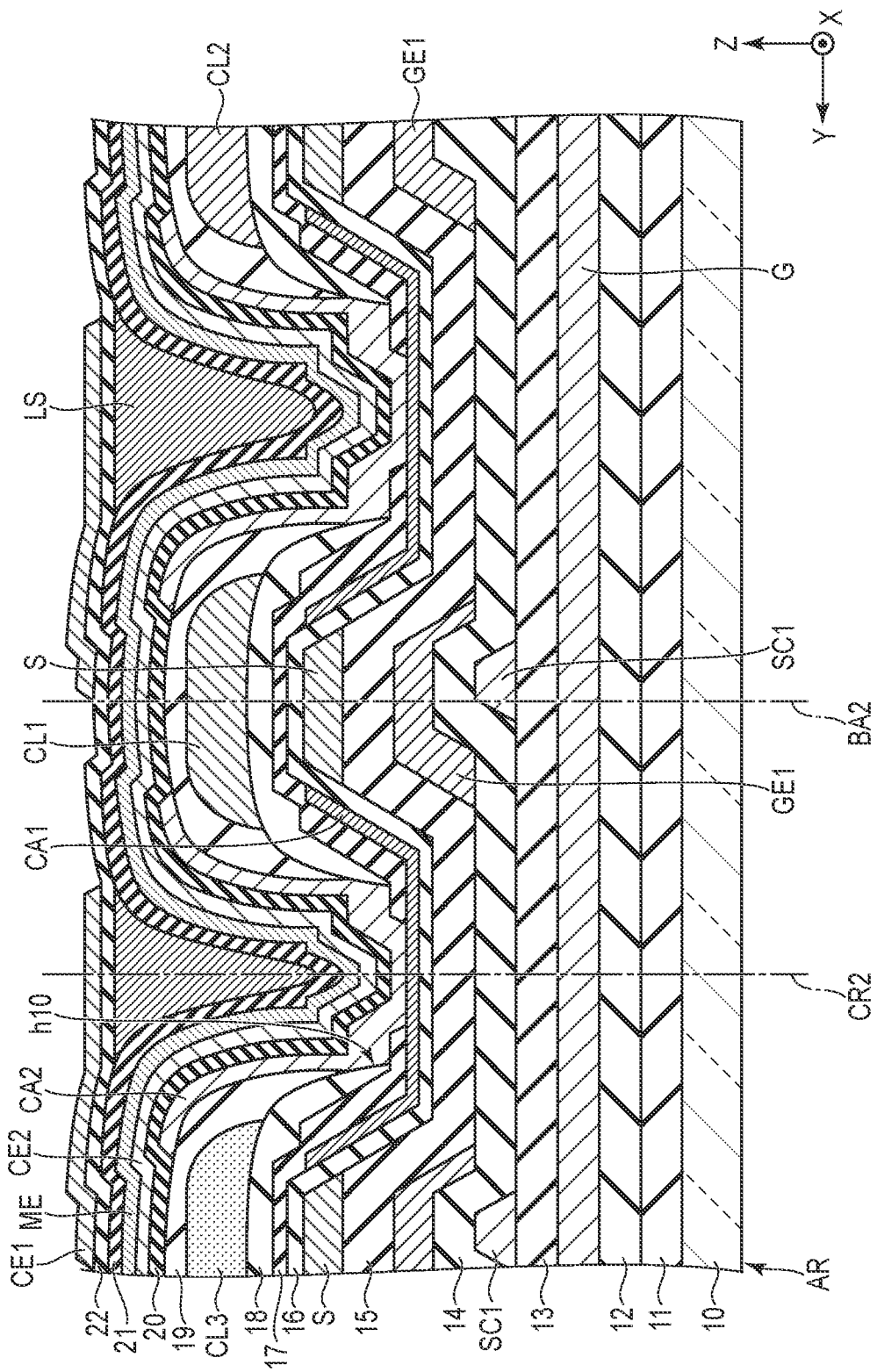
FIG. 15 is a cross-sectional view showing the array substrate along line XV-XV in FIG. 8.

FIG. 15 is a cross-sectional view showing the array substrate AR along line XV-XV in FIG. 8. In the drawing, the alignment film 29 is not shown.

As shown in FIG. 15, a center line CR2 is a virtual straight line in the third direction Z passing through the center of the opening area OA in the first direction X. The contact hole h10, etc., are located on the center line CR2. A boundary line BA2 is a virtual straight line in the third direction Z passing through the boundary of pixels PX adjacent in the first direction X. The gate electrode GE1, the source line S, etc., are located on the boundary line BA2.

The contact hole h10 is filled with the contact electrode CA2, the insulating layer 20, the second common electrode CE2, the metal layer ME, the insulating layer 21, and the light-shielding material LS.

The liquid crystal display device DSP of the present embodiment is configured as described above.

Next, the manufacturing process of the liquid crystal display device DSP of the present embodiment will be described. Here, among the manufacturing processes of the liquid crystal display device DSP, the manufacturing process of the array substrate AR will be described. FIG. 16 to FIG. 28 illustrate the manufacturing process of the array substrate AR. In FIG. 16 to FIG. 28, a part of the display area is enlarged and shown.

As shown in FIG. 16 and FIG. 5, when the manufacturing of the array substrate AR is started, first, the first insulating substrate 10, or a large plate that includes the first insulating substrate 10 and is larger in size than the first insulating substrate 10 is prepared. Then, on the first insulating substrate 10 (or the large plate), the insulating layer 11, a plurality of semiconductor layers SC2, and the insulating layer 12 are formed in sequence.

Next, a plurality of gate lines G and a plurality of gate electrodes GE2 are simultaneously formed on the insulating layer 12. Note that, in FIG. 16 (and FIG. 17 to FIG. 10, and FIG. 24 to FIG. 28), virtual reference lines are applied in a lattice pattern. In the present embodiment, a first reference line RL1 in the first direction X corresponds to a line that bisects the main line portion Ga in the second direction Y, and a second reference line RL2 in the second direction Y corresponds to a line that bisects the protruding portion Gb in the first direction X. An area that is surrounded by two neighboring first reference lines RL1 and two neighboring second reference lines RL2 corresponds to an area (size) of the pixel PX. In the present embodiment, the pixel PX has a side of 10 µm or less and is finely configured.

Subsequently, the insulating layer 13 is formed on the insulating layer 12, the plurality of gate lines G, and the plurality of gate electrodes GE2.

For example, the width of the plurality of gate lines G is 5 µm, and a space between adjacent gate lines G is 3 nm. Furthermore, the above-mentioned figures of the width of the gate lines G and the space between the gate lines G are values that do not include the protruding portion Gb.

Figure 17:
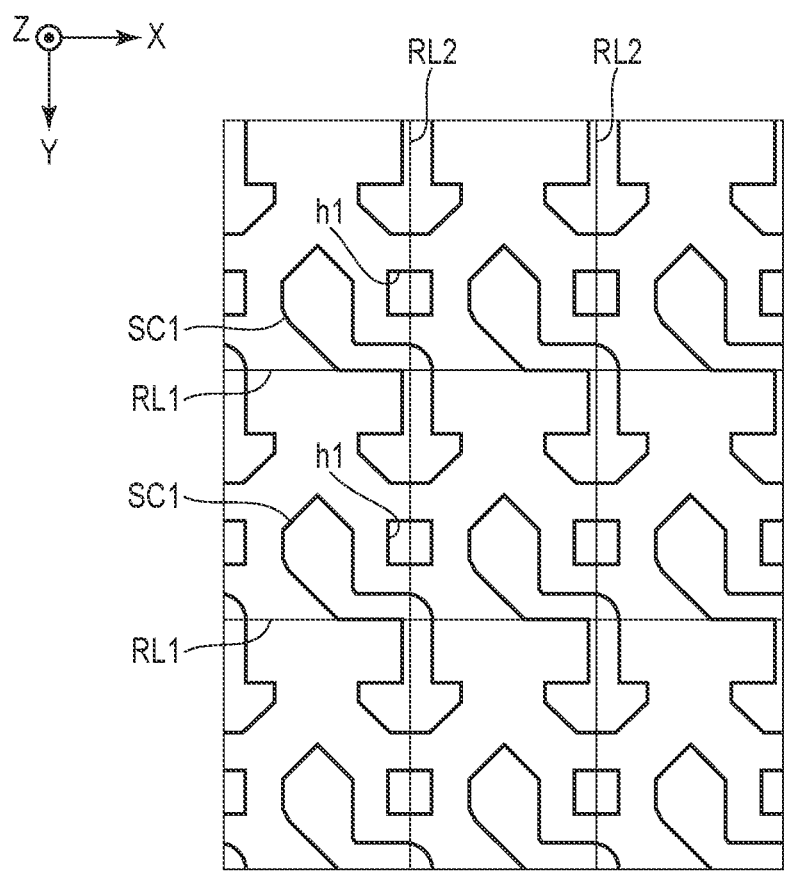
FIG. 17, following

As shown in FIG. 17 and FIG. 5, subsequently, the semiconductor layer SC1 is formed on the insulating layer 13 using an oxide semiconductor. Next, the insulating layer 14 is formed on the insulating layer 13 and the semiconductor layer SC1. The above-mentioned semiconductor cap layer may then remain to be formed on the insulating layer 14, or may be removed after being formed. Subsequently, the contact holes h1, h2, and h3 are formed simultaneously by dry etching. Since the contact hole h1 does not overlap the semiconductor layer SC1, it is possible to avoid a situation in which the semiconductor layer SC1 disappears.

As shown in FIG. 18 and FIG. 5, the gate electrode GE1 and the lower contact electrodes BC1 and BC2 are then formed on the insulating layer 14. Subsequently, the resistance of the first area R1 and the second area R2 of the semiconductor layer SC1 is lowered. For example, impurities are implanted into the first area R1 and the second area R2 of the semiconductor layer SC1 by using an ion implantation method. Phosphorus, boron, etc., can be cited as the above impurities. As a result, the switching element SW1 comprising the semiconductor layer SC1, the gate electrode GE1, etc., is formed.

Next, the insulating layer 15 is formed on the insulating layer 14, the gate electrode GE1, and the lower contact electrodes BC1 and BC2. Subsequently, the contact holes h4, h5, and h6 are formed simultaneously.

Figure 19:
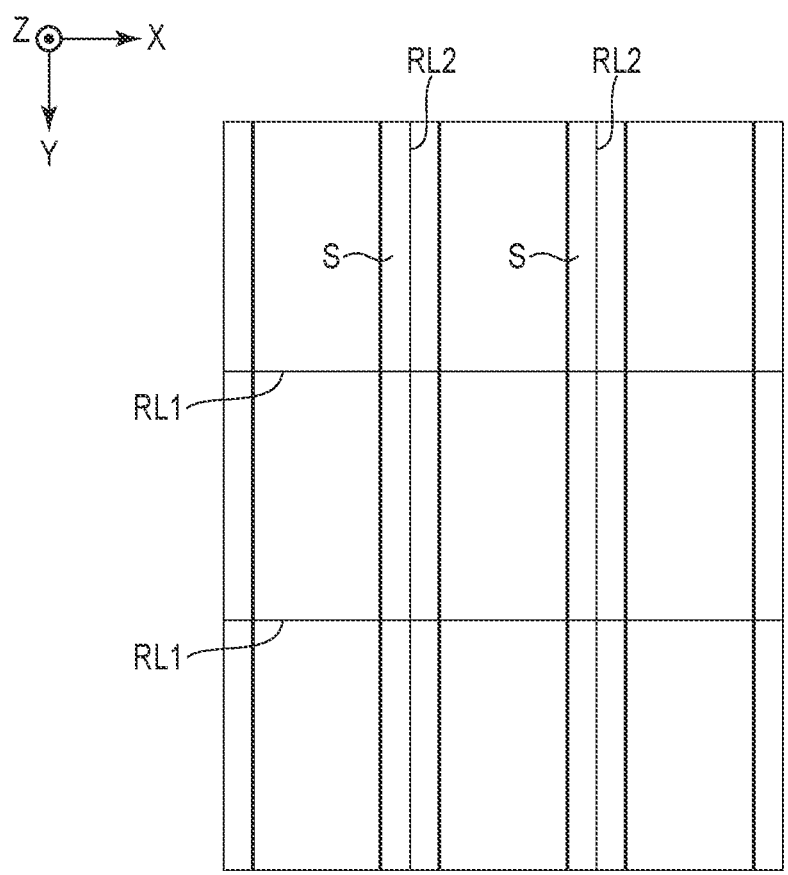
FIG. 19, following

Then, as shown in FIG. 19 and FIG. 5, the source line S and the upper contact electrodes UC1 and UC2 are formed simultaneously on the insulating layer 15. Subsequently, the insulating layer 16 is formed on the insulating layer 15, the source line S, and the upper contact electrodes UC1 and UC2.

Then, as shown in FIG. 20, after forming the contact hole h7 in the insulating layers 14, 15, and 16, the contact electrode CA1 is formed on the insulating layer 16. The contact electrode CA1 covers the entire contact hole h7. Therefore, it is possible to avoid a situation in which the semiconductor layer SC1 disappears due to etching when forming the contact electrode CA1. Subsequently, the insulating layer 17 and the contact hole h17 are formed on the insulating layer 16 and the contact electrode CA1. The contact hole h17 can be formed by dry etching.

As shown in FIG. 21, furthermore, the insulating layer 18 is formed on the contact electrode CA1 and the insulating layer 17 thereafter. The insulating layer 18 can fill the contact hole h17 and also the contact hole h7. This makes it possible to avoid a situation in which voids are formed in the contact hole h7 and an afterimage liquid used during manufacturing remains. Then, the occurrence of non-uniformity in display can be suppressed.

As shown in FIG. 22, subsequently, a plurality of first color layers CL1, a plurality of second color layers CL2, and a plurality of third color layers CL3 are formed in sequence. When forming the colored layers CL, a negative type photosensitive resist is applied, and the above-mentioned photosensitive resist patterning is performed by a photolithography method.

Note that, as shown in FIG. 23, in a case where the colored layer CL is formed without forming the insulating layer 18 on the first insulating substrate 10, a portion of the colored layer CL that is located in the contact hole h7 will be scraped undesirably due to undercutting. When the undercut occurs during the manufacture of the colored layer CL, voids are formed in the contact hole h7. Alternatively, the afterimage liquid may remain in the contact hole h7. Alternatively, voids may be formed in the contact hole h7, and the afterimage liquid may remain in the contact hole h7. Therefore, the configuration shown in FIG. 23 causes non-uniformity in display.

Figure 24:
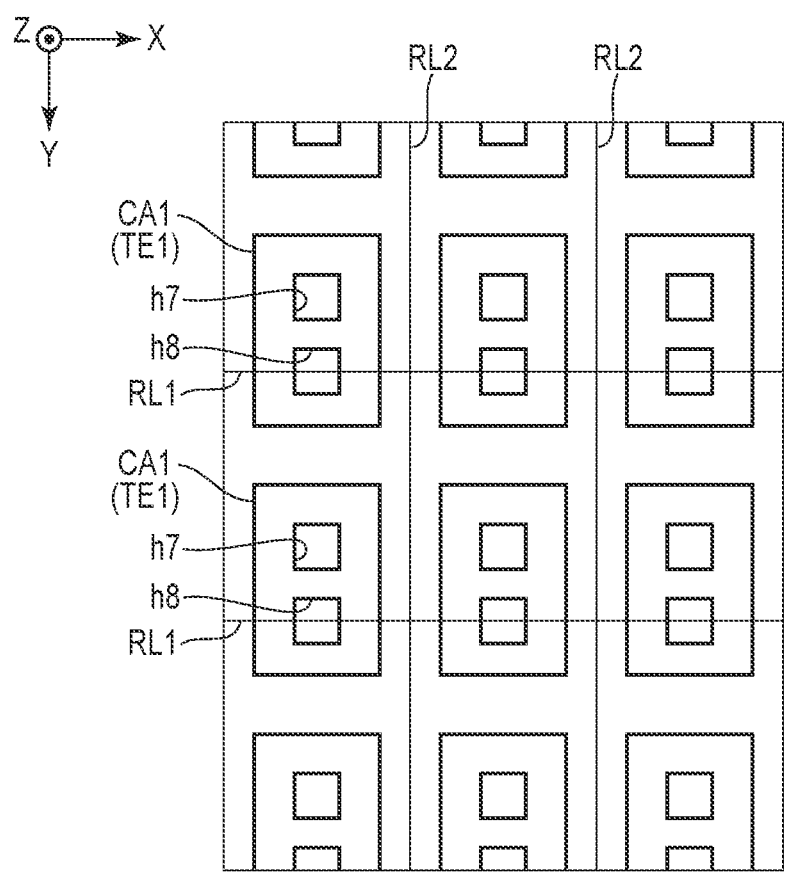
FIG. 24, following

As shown in FIG. 24 and FIG. 5, the contact hole h8 is then formed. The contact hole h8 is a contact hole formed in the color filter CF and is formed at the boundary between colored layers of different colors. Subsequently, the insulating layer 19 is formed on the color filter CF.

Although the contact hole h17 is omitted in FIG. 24, as shown in FIG. 5, the contact hole h17 overlaps the contact hole h8.

Figure 25:
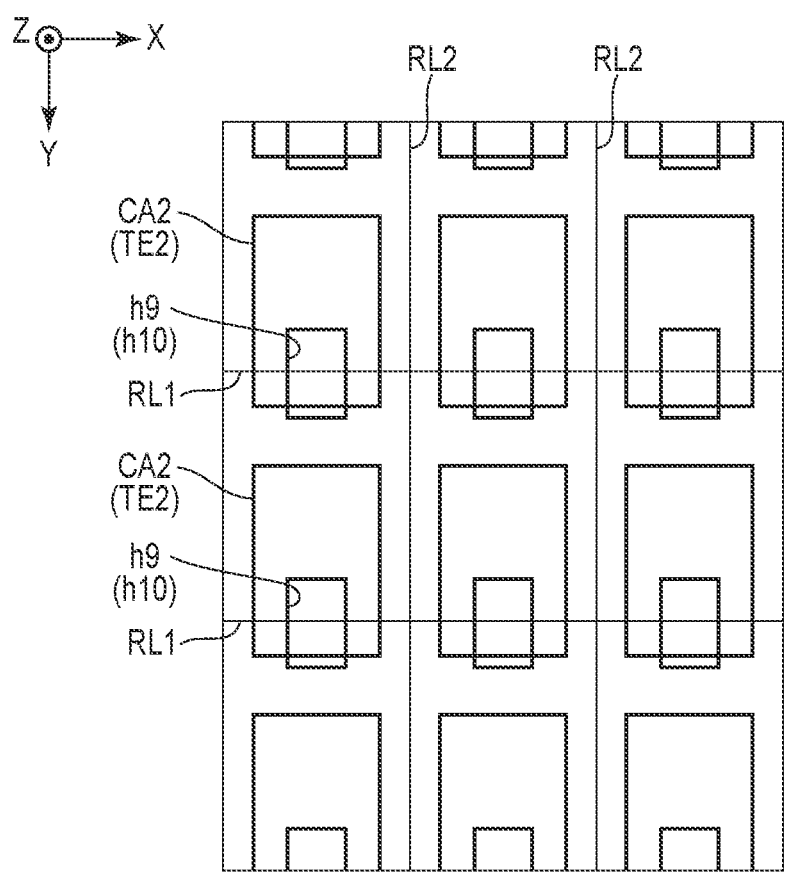
FIG. 25, following

As shown in FIG. 25 and FIG. 5, the contact hole h9 is then formed. Then, the contact electrode CA2 and the connection electrode CN1 are formed on the insulating layer 19. As mentioned above, the contact electrode CA2 does not have to cover the entire contact hole h9. Since ITO of the contact electrode CA1 is crystallized during the manufacture of the contact electrode CA2, the contact electrode CA1 would not disappear by the etching solution for the second transparent conductive layer TE2 including the contact electrode CA2. Subsequently, the insulating layer 20 is formed on the insulating layer 19, the contact electrode CA2, and the connection electrode CN1.

As shown in FIG. 26 and FIG. 5, the second common electrode CE2 is then formed on the insulating layer 20.

Figure 27:
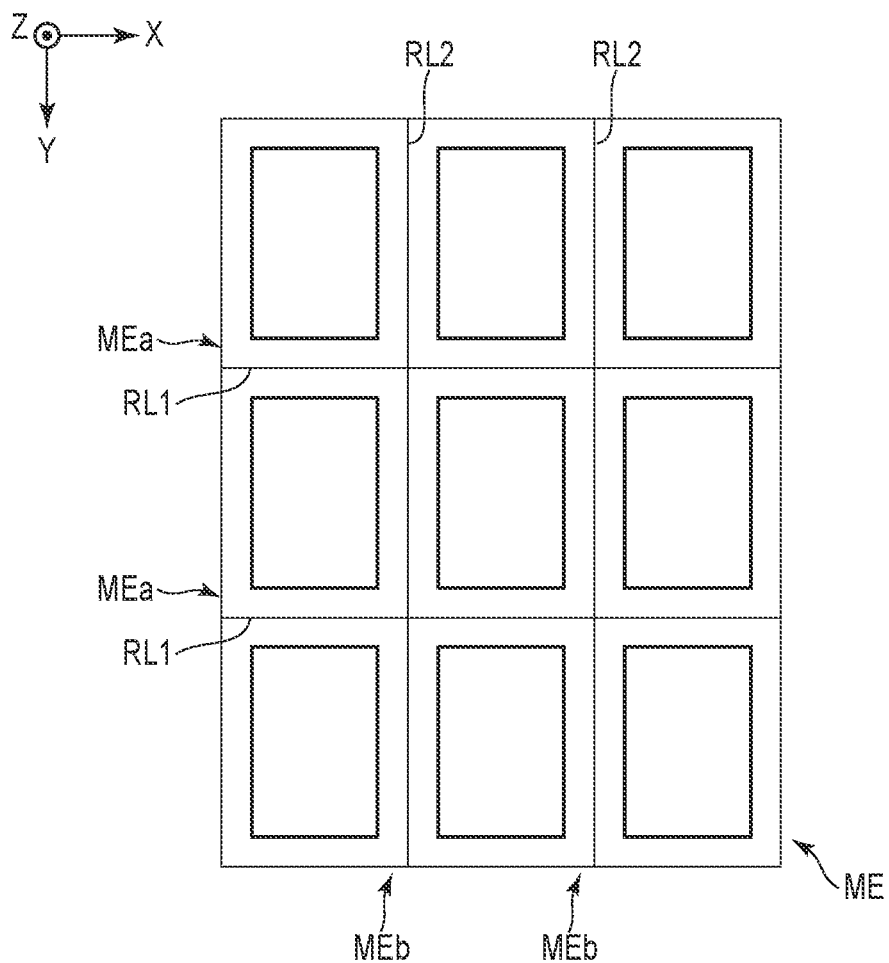
FIG. 27, following

As shown in FIG. 27 and FIG. 5, the metal layer ME is then formed on the second common electrode CE2. Then, the insulating layer 21 is formed on the insulating layer 20, the second common electrode CE2, and the metal layer ME.

Figure 28:
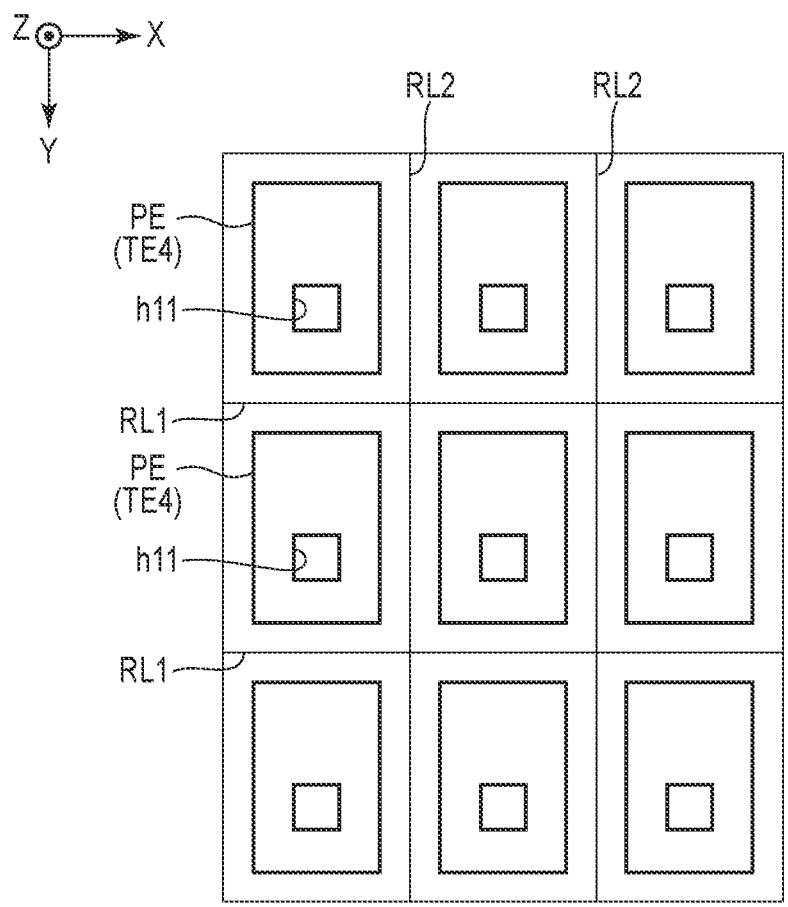
FIG. 28, following

As shown in FIG. 28 and FIG. 5, the contact holes h11, h12, and h13 are then simultaneously formed. Then, the pixel electrode PE and the connection electrode CN2 are simultaneously formed on the insulating layer 21.

Subsequently, the insulating layer 22, the first common electrode CE1, the spacer 28, and the alignment film 29 are formed in sequence on the insulating layer 21, the pixel electrode PE, and the connection electrode CN2. This completes the manufacture of the array substrate AR.

According to the liquid crystal display device DSP of the present embodiment configured as described above, the array substrate AR comprises a plurality of transparent conductive layers TE that are stacked facing each other. For example, since the array substrate AR includes the common electrodes CE1 and CE2 that overlap the pixel electrode PE, the storage capacitor CS can be secured without expanding the pixel electrode PE in planar view. Therefore, it is possible to obtain a liquid crystal display device DSP that can achieve higher definition.

In addition, the channel area RC1 of the semiconductor layer SC1 is bent in the area overlapping the gate electrode GE1. The fineness of the plurality of pixels PX in the display area DA is 2000 ppi or higher. With respect to the colored layer CL, the width W2 is five times or less the thickness T2, and the length L2 is five times or less the thickness T2. Therefore, it is possible to obtain a liquid crystal display device DSP that can achieve higher definition.

Furthermore, in the high-definition (ultra-high-definition) liquid crystal display device DSP, it is possible to obtain a liquid crystal display device DSP that can improve the aperture ratio as much as possible and can secure a design margin. For example, forming the contact electrode CA1 located in the opening area OA with a transparent conductive material can contribute to improving the aperture ratio. The above liquid crystal display device DSP can be applied to, for example, VR (Virtual Reality) applications.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the above-described embodiments are applicable to liquid crystal display devices other than the above-described liquid crystal display device DSP, and to display devices other than liquid crystal display devices.

What is claimed is:

1. A display device comprising:
   a semiconductor layer including a first area, a second area, and a channel area between the first area and the second area;
   a first insulating layer located on the semiconductor layer;
   a gate electrode located on the first insulating layer and facing the channel area;
   a second insulating layer located on the first insulating layer and the gate electrode;
   a third insulating layer located on the second insulating layer and formed of an organic insulating material;
   a color filter located on the third insulating layer;
   a plurality of transparent conductive layers located on the second insulating layer and including a pixel electrode, a first conductive layer, a second conductive layer, a third conductive layer, a fourth conductive layer, and a fifth conductive layer;
   a fourth insulating layer located between the color filter and the second conductive layer;
   a fifth insulating layer located on the fourth insulating layer;
   a sixth insulating layer located on the fifth insulating layer; and
   a seventh insulating layer located on the sixth insulating layer,
   wherein
   the first conductive layer is located between the second insulating layer and the third insulating layer, and is in contact with the second area of the semiconductor layer through a first contact hole formed in the first insulating layer and the second insulating layer,
   the second conductive layer is located on the color filter and the fourth insulating layer, is covered by the fifth insulating layer, and is in contact with the first conductive layer through a second contact hole formed in the fourth insulating layer, the color filter, and the third insulating layer,
   the third conductive layer is provided on the fifth insulating layer, is covered by the sixth insulating layer, and faces the second conductive layer,
   the fourth conductive layer is provided on the sixth insulating layer, is covered by the seventh insulating layer, is electrically connected to the second conductive layer, and faces the third conductive layer,
   the pixel electrode is configured by the fourth conductive layer, is located on the second conductive layer, and is in contact with the second conductive layer,
   the fifth conductive layer is provided on the seventh insulating layer, is electrically connected to the third conductive layer, and faces the fourth conductive layer, and
   a first electrical system including the first conductive layer, the second conductive layer, and the fourth conductive layer is electrically independent of a second electrical system including the third conductive layer and the fifth conductive layer.

2. The display device according to claim 1, further comprising:
   a display area; and
   a plurality of pixels located in the display area,
   wherein
   one of the plurality of pixels includes the semiconductor layer, the gate electrode, a colored layer of the color filter, the first conductive layer, the second conductive layer, and the pixel electrode, and
   fineness of the plurality of pixels in the display area is 2000 ppi or higher.

3. The display device according to claim 1, further comprising:
   a display area; and
   a plurality of pixels located in the display area and lined up in a matrix in a first direction and a second direction that intersect each other,
   wherein
   the color filter includes colored layers in multiple colors,
   one of the plurality of pixels includes the semiconductor layer, the gate electrode, the colored layer, the first conductive layer, the second conductive layer, and the pixel electrode, each of the colored layer has a thickness, a width, which is a distance in the first direction, and a length, which is a distance in the second direction, the width is less than or equal to five times the thickness, and the length is less than or equal to five times the thickness.

4. The display device according to claim 1, further comprising:

a display area; and a plurality of pixels located in the display area and lined up in a matrix in a first direction and a second direction that intersect each other, wherein the color filter includes a plurality of colored layers including a plurality of first color layers, a plurality of second color layers, and a plurality of third color layers, one of the plurality of pixels includes the semiconductor layer, the gate electrode, the colored layer, the first conductive layer, the second conductive layer, and the pixel electrode, the plurality of pixels include a plurality of first color pixels each containing the first color layer, a plurality of second color pixels each containing the second color layer, and a plurality of third color pixels each containing the third color layer, in each row of the plurality of pixels, the first color pixel, the second color pixel, and the third color pixel are repeatedly arranged in this order in the first direction, and in each column of the plurality of pixels, the first color pixel, the third color pixel, and the second color pixels are repeatedly arranged in this order in the second direction.

5. The display device according to claim 1, further comprising:

a light shielding material that is located on the second contact hole, is provided on the sixth insulating layer, is covered by the seventh insulating layer, and fills the second contact hole together with the second conductive layer, the fifth insulating layer, and the sixth insulating layer.

6. The display device according to claim 1, wherein the semiconductor layer includes an oxide semiconductor.

7. The display device according to claim 1, further comprising:

a plurality of gate lines extending in a first direction and lined up at intervals in a second direction intersecting the first direction; and a plurality of source lines extending in the second direction, lined up at intervals in the first direction, and intersecting the plurality of gate lines, wherein the gate electrode is electrically connected to one of the plurality of gate lines and is located in an area overlapping the gate line and the source line, the first area is electrically connected to one of the plurality of source lines, and the second area, the first conductive layer, and the first contact hole are located in an opening area surrounded by a pair of adjacent gate lines and a pair of adjacent source lines among the plurality of gate lines and the plurality of source lines.

8. The display device according to claim 1, wherein the third insulating layer has a first flat surface on a side facing the color filter, and the color filter includes a colored layer having a second flat surface on a side facing the pixel electrode.

* * * * *